US012750659B2

(12) United States Patent
Whyte et al.

(10) Patent No.: US 12,750,659 B2
(45) Date of Patent: Sep. 29, 2026

(54) METHOD AND SYSTEM FOR PROTECTING PROPRIETARY INFORMATION USED TO DETERMINE A MISBEHAVIOR CONDITION FOR VEHICLE-TO-EVERYTHING (V2X) REPORTING

(71) Applicant: QUALCOMM Incorporated, San Diego, CA (US)

(72) Inventors: William Whyte, Natick, MA (US); Jonathan Petit, Wenham, MA (US); Jean-Philippe Monteuuis, Northborough, MA (US); Mohammad Raashid Ansari, Saugus, MA (US); Cong Chen, San Diego, CA (US); Virendra Kumar, Sudbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 18/889,065

(22) Filed: Sep. 18, 2024

(65) Prior Publication Data

US 2025/0016554 A1 Jan. 9, 2025

Related U.S. Application Data

(62) Division of application No. 17/482,263, filed on Sep. 22, 2021, now Pat. No. 12,126,993.
(Continued)

(51) Int. Cl.
*H04W 12/03* (2021.01)
*H04W 4/38* (2018.01)
(Continued)

(52) U.S. Cl.
CPC ............. *H04W 12/03* (2021.01); *H04W 4/38* (2018.02); *H04W 4/40* (2018.02); *H04W 12/0471* (2021.01); *H04W 12/121* (2021.01)

(58) Field of Classification Search
CPC ........... H04W 4/38; H04W 4/46; H04W 4/48; H04W 12/03; H04L 2209/84
(Continued)

(56) References Cited

U.S. PATENT DOCUMENTS 10,154,061 B1 * 12/2018 Schetina ............. H04L 63/0414
11,082,846 B2 8/2021 Hawkes et al.
(Continued)

FOREIGN PATENT DOCUMENTS

EP 3641372 A1 * 4/2020 ............ H04W 12/02
TW 202019131 A 5/2020
WO 2017027820 A1 2/2017

OTHER PUBLICATIONS

ETSI: "Intelligent Transport Systems (ITS), Security, Misbehaviour Reporting Service, Release 2", ETSI Draft Specification, 103 759, European Telecommunications Standards Institute (ETSI), 650, Route Des Lucioles, F-06921 Sophia-Antipolis, France, No. V0.0.2, Jan. 12, 2021, pp. 1-27, XP014387961. (Year: 2021).*
(Continued)

*Primary Examiner* — Lizbeth Torres-Diaz
(74) *Attorney, Agent, or Firm* — Polsinelli LLP

(57) ABSTRACT

Embodiments include methods performed by a vehicle-to-everything (V2X) system for protecting proprietary data within misbehavior reports. The method includes receiving a misbehavior report from a V2X system participant, obtaining sensor data from the received misbehavior report indicating that a misbehavior condition has occurred, determining whether the sensor data indicating that a misbehavior condition has occurred includes encrypted proprietary information. In response to determining that the sensor data includes encrypted proprietary information, the V2X system identifies an entity that owns the encrypted proprietary information, transmits the misbehavior report including the encrypted proprietary information to the entity that owns the
(Continued)

encrypted proprietary information, and receives a confirmation report from the entity that owns the encrypted proprietary information indicating whether the misbehavior report is accurate.

20 Claims, 13 Drawing Sheets

Related U.S. Application Data

(60) Provisional application No. 63/147,350, filed on Feb. 9, 2021.

(51) Int. Cl.
*H04W 4/40* (2018.01)
*H04W 12/0471* (2021.01)
*H04W 12/121* (2021.01)

(58) Field of Classification Search
USPC .......................................... 713/171; 726/26
See application file for complete search history.

(56) References Cited

U.S. PATENT DOCUMENTS

| | | | | |
|---|---|---|---|---|
| 11,516,669 | B2 * | 11/2022 | Shimizu | H04W 4/40 |
| 2015/0074409 | A1 * | 3/2015 | Reid | G06F 21/6218 713/171 |
| 2019/0297499 | A1 * | 9/2019 | Hawkes | H04W 12/40 |
| 2020/0258320 | A1 | 8/2020 | Lu et al. | |
| 2020/0273340 | A1 | 8/2020 | Kang et al. | |
| 2020/0274892 | A1 * | 8/2020 | Kim | H04W 4/40 |
| 2020/0280842 | A1 * | 9/2020 | Liu | H04W 4/44 |
| 2020/0314491 | A1 | 10/2020 | Rodgers et al. | |
| 2022/0172010 | A1 * | 6/2022 | Pese | G06F 18/25 |
| 2022/0246031 | A1 * | 8/2022 | Vijaya Kumar | G08G 1/096741 |
| 2022/0256333 | A1 | 8/2022 | Whyte et al. | |
| 2022/0277225 | A1 | 9/2022 | Gilberton et al. | |

OTHER PUBLICATIONS

Taiwan Search Report—TW110144298—TIPO—Mar. 15, 2025.

ETSI: "Intelligent Transport Systems (ITS), Security, Misbehaviour Reporting Service, Release 2", ETSI Draft Specification, 103 759, European Telecommunications Standards Institute (ETSI), 650, Route Des Lucioles, F-06921 Sophia-Antipolis, France, No. V0.0.2, Jan. 12, 2021, pp. 1-27, XP014387961, sections 4, 5.

International Preliminary Report on Patentability—PCT/US2021/060938—The International Bureau of WIPO—Geneva, Switzerland—Aug. 24, 2023. 12 pages.

International Search Report and Written Opinion—PCT/US2021/060938—ISA/EPO—Feb. 25, 2022. 19 pages.

Qualcomm Technologies Int: "SCMS Manager Misbehavior Report and Application Specification", ETSI Draft, ITSWG5 (21) 057009R1, European Telecommunications Standards Institute (ETSI), 650, Route Des Lucioles, F-06921 Sophia-Antipolis, France, vol. WG ITS WG5 Security, Feb. 8, 2021 (Feb. 8, 2021), pp. 1-11, XP014392898, p. 10, paragraph 3.

* cited by examiner

METHOD AND SYSTEM FOR PROTECTING PROPRIETARY INFORMATION USED TO DETERMINE A MISBEHAVIOR CONDITION FOR VEHICLE-TO-EVERYTHING (V2X) REPORTING

RELATED APPLICATIONS

This application is a division of U.S. application Ser. No. 17/482,263 entitled "Method and System for Protecting Proprietary Information Used to Determine a Misbehavior Condition for Vehicle-to-Everything (V2X) Reporting" filed Sep. 22, 2021, which claims the benefit of priority of U.S. Provisional Application No. 63/147,350 entitled "Method and System for Protecting Proprietary Information Used to Determine a Misbehavior Condition for Vehicle-to-Everything (V2X) Reporting" filed Feb. 9, 2021, the entire contents of both which are incorporated herein by reference for all purposes.

BACKGROUND

Multiple regions of the world are developing standards for vehicle-based communication systems and functionality. For example, standards developed in Institute of Electrical and Electronics Engineers (IEEE) and Society of Automotive Engineers (SAE) for use in North America, or in European Telecommunications Standards Institute (ETSI) and European Committee for Standardization (CEN) for use in Europe. Part of that system is the ability for a vehicle to broadcast Basic Safety Messages (BSM) in North America or Cooperative Awareness Messages (CAM) in Europe, which other vehicles can receive and process to improve traffic safety. The processing of such messages in the transmitting and receiving vehicles occurs in onboard equipment that provide the vehicle-to-everything (V2X) functionality (referred to herein as "V2X onboard equipment").

The cellular vehicle-to-everything (C-V2X) protocol is one such protocol being developed as a foundation for vehicle-based wireless communications, that may be used to support intelligent highways, autonomous and semi-autonomous vehicles, and improve the overall efficiency and safety of the highway transportation systems.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc. Other V2X wireless technologies are also under consideration in different regions of the world. The techniques described in this patent are applicable to any V2X wireless technology.

SUMMARY

Various aspects include methods performed by a V2X equipment processor for protecting proprietary information in V2X messages reporting that a misbehavior condition has occurred. Various aspects may include encrypting proprietary information included in sensor data obtained from one or more sensors indicating that a misbehavior condition has occurred, generating a misbehavior report identifying the misbehavior condition and including information regarding the encrypted proprietary information, and transmitting the generated misbehavior report to a misbehavior managing authority.

Some aspects may further include determining whether the sensor data obtained from one or more sensors indicating that a misbehavior condition has occurred includes proprietary information, in which encrypting proprietary information included in the sensor data may include encrypting portions of the sensor data that include proprietary information in response to determining that the sensor data obtained from one or more sensors indicating that a misbehavior condition has occurred includes proprietary information.

Some aspects may further include identifying each entity that owns an instance of proprietary information included in the sensor data indicating that a misbehavior condition has occurred, in which encrypting proprietary information included in sensor data obtained from one or more sensors indicating that a misbehavior condition has occurred may include encrypting instances of proprietary information included in the sensor data using a public key associated with the entity that owns respective instances of proprietary information.

Some aspects may further include determining whether it is inappropriate to transmit a misbehavior report including encrypted proprietary information to the misbehavior managing authority, generating the misbehavior report to include the encrypted proprietary information in response to determining that it is appropriate to transmit a misbehavior report including encrypted proprietary information to the misbehavior managing authority, and in response to determining that it is inappropriate to transmit a misbehavior report including encrypted proprietary information to the misbehavior managing authority: generating the misbehavior report to include a field indicating that sensor data indicating that a misbehavior condition has occurred is or will be transmitted separately, and downloading the encrypted proprietary information over a secure communication link.

In some aspects, determining whether it is inappropriate to transmit to a misbehavior report to the misbehavior managing authority may include determining that the generated misbehavior report is inappropriate to transmit in response to determining that the encrypted proprietary information that supports the conclusion that the misbehavior condition has occurred is too large to transmit in a misbehavior report. In some aspects, determining whether the generated misbehavior report is inappropriate to transmit to the misbehavior managing authority may include determining that the generated misbehavior report is inappropriate to transmit in response to determining that the encrypted proprietary information that supports the conclusion that the misbehavior condition has occurred should not be transmitted over an unsecure wireless communication link.

In some aspects, the field that indicates that sensor data supporting the conclusion that the misbehavior condition has occurred is transmitted separately includes information identifying a location to which the encrypted proprietary information was downloaded over the secure communication link.

Further aspects may include a V2X system participant having a processor configured to perform one or more operations of any of the methods summarized above. Further aspects may include a non-transitory processor-readable storage medium having stored thereon processor-executable instructions configured to cause a V2X equipment processor to perform operations of any of the methods summarized above. Further aspects include V2X system participant having means for performing functions of any of the methods summarized above.

Further aspects may include receiving a misbehavior report from a V2X system participant, obtaining sensor data from the received misbehavior report indicating that a misbehavior condition has occurred, determining whether the sensor data indicating that a misbehavior condition has occurred includes encrypted proprietary information, and in response to determining that the sensor data includes encrypted proprietary information: identifying an entity that owns the encrypted proprietary information, transmitting the misbehavior report including the encrypted proprietary information to the entity that owns the encrypted proprietary information, and receiving a confirmation report from the entity that owns the encrypted proprietary information indicating whether the misbehavior report is accurate.

In some aspects, identifying an entity that owns the encrypted proprietary information comprises identifying each entity that owns each instance of encrypted proprietary information included in the misbehavior report, transmitting the misbehavior report including the encrypted proprietary information to the entity that owns the encrypted proprietary information comprises transmitting the misbehavior report including the encrypted proprietary information to each entity that owns an instance of encrypted proprietary included in the misbehavior report, and receiving a confirmation report from the entity that owns the encrypted proprietary information indicating whether the misbehavior report is accurate comprises receiving a confirmation report from each entity that owns an instance of encrypted proprietary information indicating whether the misbehavior report is supported by that entity's encrypted proprietary information.

Some aspects may further include obtaining from the received confirmation report information or instructions for responding to a misbehavior condition identified in the misbehavior report, and transmitting the information or instructions for responding to a misbehavior condition to the V2X system participant.

Further aspects may include a misbehavior managing authority server having a processor configured to perform one or more operations of any of the methods summarized above. Further aspects may include a non-transitory processor-readable storage medium having stored thereon processor-executable instructions configured to cause a misbehavior managing authority server processor to perform operations of any of the methods summarized above. Further aspects include a misbehavior managing authority server having means for performing functions of any of the methods summarized above.

Further aspects may include receiving a misbehavior report from a misbehavior managing authority, obtaining identification of a misbehavior condition from the received misbehavior report and information regarding encrypted proprietary information included in sensor data indicating that the misbehavior condition has occurred, decrypting the encrypted proprietary information included in sensor data, determining whether the misbehavior condition is supported at least in part by decrypted proprietary information, generating a confirmation report that indicates whether the misbehavior report is accurate, and transmitting the confirmation report to the misbehavior managing authority.

In some aspects, the information regarding encrypted proprietary information included in sensor data indicating that the misbehavior condition has occurred includes the encrypted proprietary information included in sensor data, and determining whether the misbehavior condition is supported at least in part by decrypted proprietary information may include determining whether the misbehavior condition is supported based at least in part on decrypted sensor data or decrypted proprietary information included in the received misbehavior report.

In some aspects, obtaining identification of a misbehavior condition from the received misbehavior report and information regarding encrypted proprietary information included in sensor data indicating that the misbehavior condition has occurred may include reading a field in the misbehavior report indicating that sensor data indicating that a misbehavior condition has occurred is or will be transmitted separately, and receiving the encrypted proprietary information included in sensor data over a secure communication link.

Some aspects may further include determining information or instructions for a V2X system participant to respond to the misbehavior condition in response to determining that the conclusion that a misbehavior condition has occurred is accurate, and including the information or instructions in the confirmation report.

Further aspects may include a server having a processing device configured to perform one or more operations of any of the methods summarized above. Further aspects may include a non-transitory processor-readable storage medium having stored thereon processor-executable instructions configured to cause a server to perform operations of any of the methods summarized above. Further aspects include a server having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
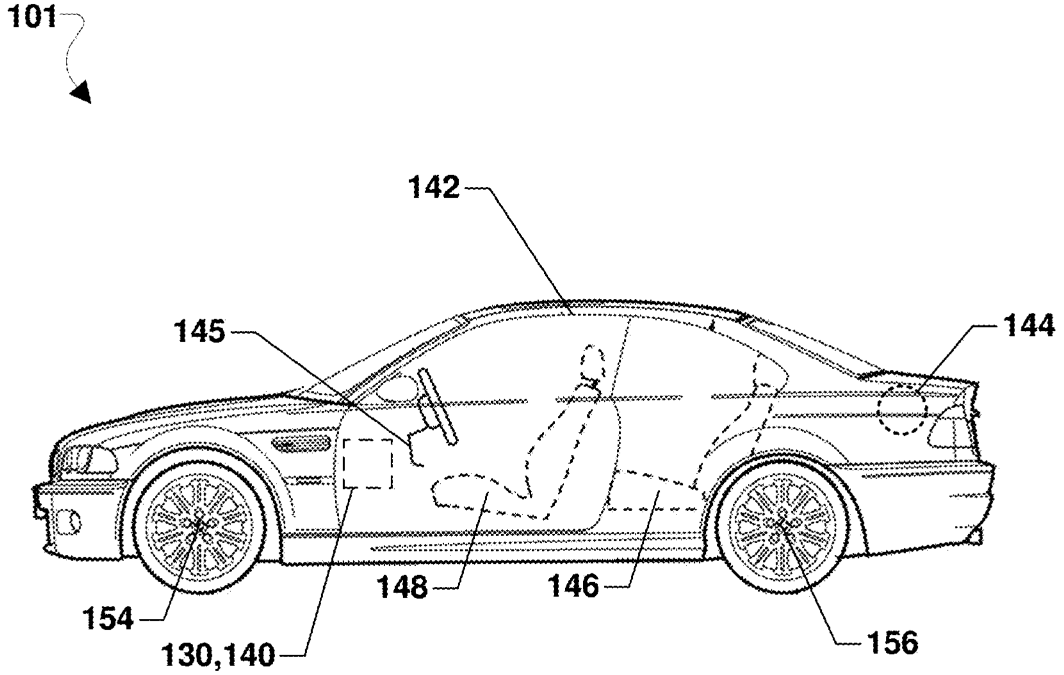
FIGS. 1A and 1B are component block diagrams illustrating a vehicle suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "misbehavior" and "misbehavior condition" relative to V2X information and V2X messages are used herein to refer a situation in which a V2X message includes inaccurate, unreliable, or falsified information, which may be due to sensor and/or V2X system malfunctions, as well as misleading information maliciously included in V2X messages. In particular in various embodiments, the term "misbehavior condition" refers to received V2X messages that include information inconsistent with the receiver's perception of ground truth or are otherwise impairing the correct operation of the V2X system. Given the safety purposes of V2X messages (e.g., BSMs), it is important for V2X participating vehicles to confirm the accuracy and integrity of such messages.

In V2X communications, a misbehavior condition may be detected by analyzing various sensor data to insure that the vehicle is operating in a consistent manner. In some instances, the underlying sensor data that supports the conclusion that a misbehavior condition has occurred may be proprietary and/or confidential, or include some information that is proprietary to a company, such as a sensor provider. To address this, various embodiments provide measures for maintaining the confidentiality of proprietary and/or confidential data included in misbehavior reports that may be transmitted by V2X equipment over public networks while enabling the authentication and processing of such misbehavior reports without disclosing such information to parties other than owners of the information.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

In overview, various embodiments include methods and systems of protecting proprietary information that is used to support a conclusion that a misbehavior condition has occurred. In various embodiments, a V2X system participant, such as a vehicle's V2X equipment, may conclude that a misbehavior condition has occurred based on analyzing sensor data, as well as data received from other V2X participants (e.g., road side units and/or other V2X-equipped vehicles). The V2X system participant may generate a misbehavior report that includes not only the V2X equipment conclusion that a misbehavior condition has occurred, but also the supporting sensor data. The generated misbehavior report may be transmitted via V2X communication links to a misbehavior managing authority for verification/confirmation that the conclusion that a misbehavior condition has occurred is accurate. To confirm the accuracy of the conclusion, the supporting sensor data may be analyzed. However, in some instances the original equipment manufacturer of the sensor or sensors may desire to protect confidential/proprietary information within the sensor data. In that case, transmitting misbehavior reports including confidential/proprietary information over open public wireless communication links, such as V2X communication links, would not be appropriate. Further, owners of such confidential/proprietary information may want to prevent Intelligent Highway System (IHS) processing entities, such as a misbehavior managing authority, from having access to the information. To address this need, various embodiments identify the confidential/proprietary nature of the sensor data that would be included in misbehavior reports and encrypt confidential/proprietary information within the sensor data before transmitting the misbehavior report.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

For ease of reference, some of the embodiments are described in this application as performed by a V2X system participant operating within V2X terminologies. However, it should be understood that various embodiments encompass any or all of the V2X/V2V or vehicle-based communication standards, messages or technologies. As such, nothing in the application should be construed to limit the claims to V2X/V2V systems unless expressly recited as such in the claims. In addition, the embodiments described herein discuss onboard equipment to perform V2X/V2V communication. In V2X/V2V systems, system participant equipment may include, but is not limited to, vehicle on-board equipment-referred to herein as V2X equipment—and roadside units (RSU). RSUs may include stationary devices such as traffic signals, roadside beacons, traffic cameras, etc. equipped with V2X radios and connections to V2X backend networks. Each of system participant equipment may broadcast information to other system participant equipment. The V2X communications among system participant equipment may allow applications executing on each V2X equipment to provide vehicles with safety information (e.g., information regarding imminent hazards such as a vehicle hard-braking or speeding out of a blind cross-street), mobility information (e.g., information regarding timing of traffic signal changes), and other useful information useful to vehicles within the vehicular transportation system as a whole.

Misbehavior reporting is a key part of the security system for V2X communications. In misbehavior reporting, field devices, such as V2X-equipped vehicles and/or RSUs, may determine whether the contents of received V2X messages are inconsistent with the totality of vehicle sensor and observation data. In instances in which a received V2X message is inconsistent with the totality of vehicle sensor and observation data from vehicle sensor data, a misbehavior condition may be detected and a misbehavior report (MBR) message may be generated and transmitted to a misbehavior managing authority via a V2X communication link. The misbehavior managing authority may aggregate MBRs from different reporting V2X system participants from across the misbehavior managing authority's region of responsibility and determine possible responses to the MBRs. There may be a wide range of potential responses by the misbehavior managing authority, including among others: determining that the MBRs are not actually reporting valid misbehavior conditions; determining that the reported MBRs are actual misbehavior conditions but are causing so little disruption that it would cost more to fix it than to let it continue; determining that a reporting V2X participant has bad software and needs to be updated; determining that the signing keys associated with a V2X participant have been extracted from the V2X participant and are being used to mount a nationwide attack of bad messages, and so the device keys need to be revoked so that no-one trusts them further.

In some V2X system implementations, a misbehavior managing authority may require information evidencing or supporting a misbehavior condition reported in an MBR to enable verification or confirmation of the accuracy of a received MBR. The misbehavior managing authority may determine that the misbehavior condition that was reported in the MBR was indeed misbehavior if the information or evidence included in the MBR is correct or valid, as well as sufficient before assessing whether a reported misbehavior is accurate. Thus, as part of analyzing the correctness or validity of received MBRs, a misbehavior managing authority may first assess whether the sensor data supporting the conclusion that a misbehavior condition has occurred is correct, valid and/or support of the reported misbehavior condition.

The misbehavior managing authority may determine whether the information or evidence included in the MBR is sufficient to assess the correctness of the MBR depending on the particular type of misbehavior condition. For example, a MBR claiming to be from a V2X participant travelling at 1000 miles per hour may be deemed to be a misbehavior condition in its own right, without any need of any evidence as no known vehicle operating within a V2X system is capable of achieving such a speed. In some cases, the reporting V2X participant may be requested to send additional data regarding the reported misbehavior condition, such as sensor data supporting the conclusion. For example, the reporting V2X participant may be requested to send additional data in an instance in which the reported V2X message is from a vehicle claiming to be neighboring to the V2X participant that is reporting the MBR, but the reporting V2X participant's sensor data does not detect any such neighboring vehicle. Thus, the reporting V2X participant that receives the original V2X message may determine that a misbehavior condition has occurred within the alleged neighboring vehicle. Including sensor data raises concerns about the trustworthiness of the reporter, and including such sensor data may permit the misbehavior managing authority to obtain a more complete picture of potential misbehavior. Therefore including supporting sensor data in MBR messages may become the standard practice in IHS systems.

A problem raised by including sensor data supporting the conclusion that a misbehavior condition has occurred within the MBR is that in some instances the sensor data may be confidential and/or proprietary to the original equipment manufacturer (OEM) of the sensor that generated the sensor data. To address this, various embodiments provide operations to protect confidential and/or proprietary within sensor data included within V2X messages such as MBR messages.

Various embodiments may include encrypting proprietary information included in sensor data obtained from one or more sensors indicating that a misbehavior condition has occurred, generating an MBR identifying the misbehavior condition, and including information regarding the encrypted proprietary information to a misbehavior managing authority. Encrypting of the sensor data may be performed in response to determining that the sensor data includes proprietary information. Further, encryption of sensor data may be performed using a public key associated with each owner of proprietary data included in the MBR, thus enabling different owners of proprietary sensor data to receive and validate proprietary sensor data generated by sensors of their manufacture without sharing such data with others. Owners of encrypted proprietary sensor data include in or associated with the MBR may then verify or confirm the accuracy of received encrypted proprietary information included in sensor data and inform the misbehavior managing authority about the accuracy or validity of the sensor data without revealing proprietary information.

By allowing the misbehavior managing authority to use sensor data to confirm or verify reported misbehavior conditions without revealing proprietary/confidential sensor data, the ability of the misbehavior management system to understand the state of a V2X system as a whole (i.e. the effectiveness and trustworthiness of all the application deployments within the system) may be significantly improved. Accordingly, enabling the use of proprietary sensor data may improve trust in a V2X system and result in greater uptake, faster market growth, and potentially more innovative applications using the system as a whole.

Figure 1B:
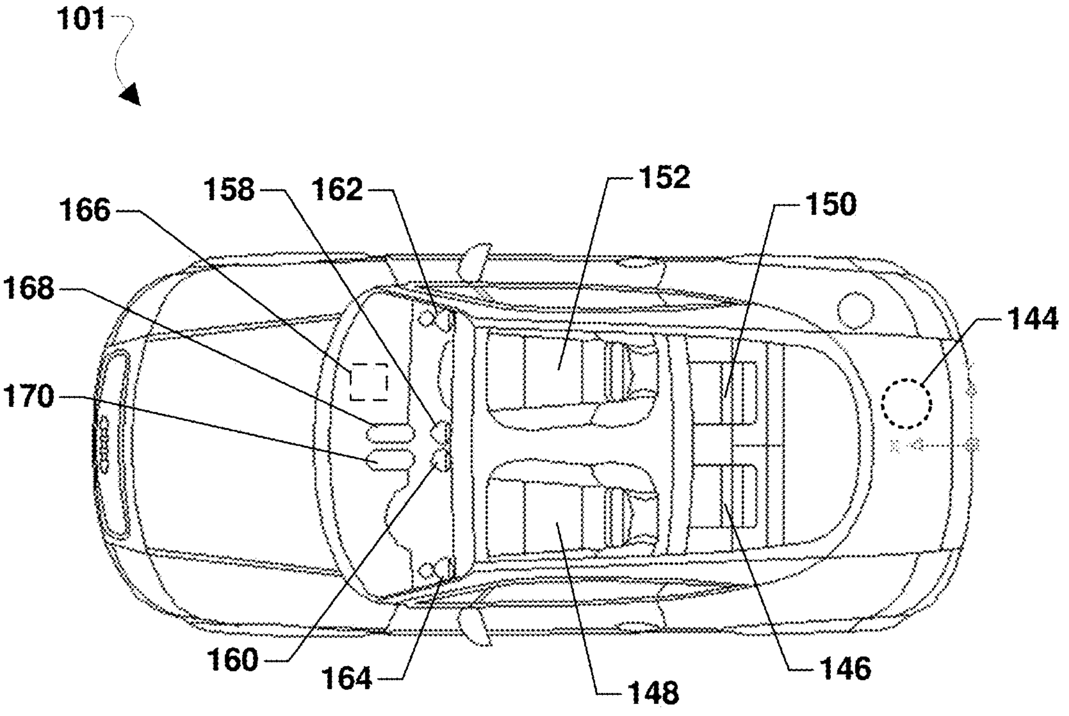

Various embodiments may be implemented within a variety of V2X system participants, an example vehicle 101 of which is illustrated in FIGS. 1A and 1B. With reference to FIGS. 1A and 1B, a vehicle 101 may include V2X equipment 130 that includes a control unit 140, which are communicatively coupled to a plurality of sensors 144-170. Non-limiting examples of sensors that may be disposed within a V2X equipped vehicle illustrated in FIGS. 1A and 1B include satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The sensor data generated by the plurality of sensors 144-170, disposed in or on the vehicle, may be used for various purposes, such as autonomous and semi-autonomous navigation and control, crash avoidance, position determination, etc., as well to provide sensor data regarding objects and people in or on the vehicle 101.

The sensors 144-170 within a vehicle 101 may include a wide variety of sensors capable of detecting a variety of information useful for navigation and collision avoidance. Each of the sensors 144-170 may be in wired or wireless communication with a control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers, pH sensors, radiation sensors, Geiger counters, neutron detectors, biological material sensors, microphones 162, 164, occupancy sensors 144, 146, 148, 150, 152, proximity sensors, and other sensors.

For ease of reference, the term "sensor data" is used herein to refer to any data that may be generated and passed to a V2X equipment by any of a variety of sensors in a vehicle, including without limitation the types of sensors illustrated in FIGS. 1A and 1B and described in the previous paragraph. Sensor data may be in any data format output by sensors, sensor managers, and/or data buses or data connections coupling sensors to V2X equipment. For example, sensor data may be in the form of a raw pixels array, an object list, an intermediate machine learning representation, a machine learning model, and/or raw digital data.

The vehicle control unit 140 may be configured with processor-executable instructions to perform various V2X system operations, and navigation and collision avoidance operations using information received from various sensors, particularly the cameras 158, 160. In some embodiments, the control unit 140 may supplement the processing of camera images using distance and relative position (e.g., relative bearing angle) that may be obtained from radar 168 and/or lidar 170 sensors. The control unit 140 may further be configured to control steering, breaking and speed of the vehicle 101 when operating in an autonomous or semi-autonomous mode using information regarding other vehicles determined using various embodiments. The control unit 140 may be further configured (e.g., with processor-executable software instructions) to perform operations providing or supporting V2X functionality, including functionality of various embodiments.

Figure 1C:
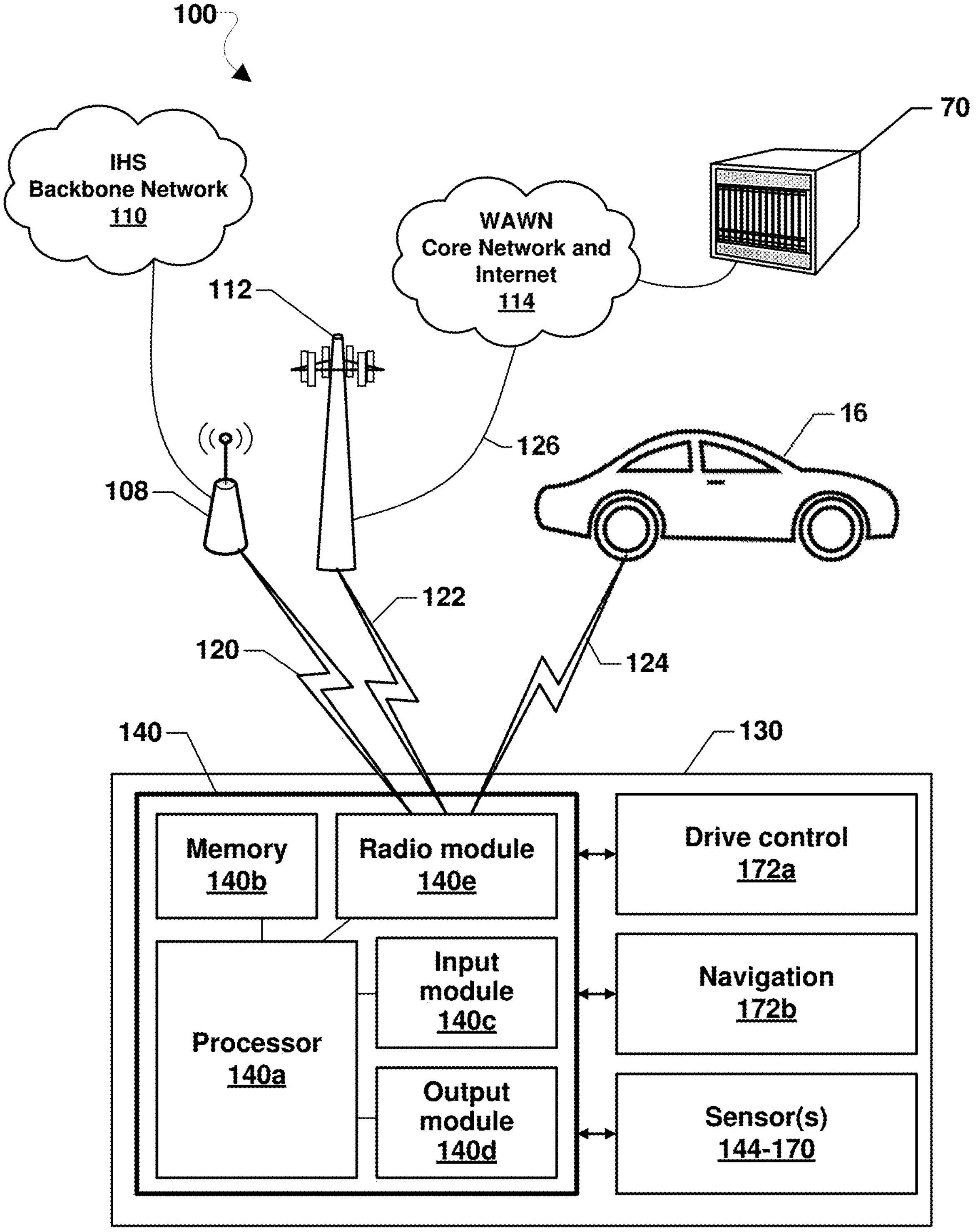
FIG. 1C is a component block diagram illustrating components of a vehicle suitable for implementing various embodiments.

FIG. 1C is a component block diagram illustrating a communication system 100 of components and support systems, including V2X equipment 130 suitable for implementing various embodiments. With reference to FIGS. 1A-1C, a vehicle 101 may include V2X equipment 130 that includes a control unit 140 coupled to vehicle controls, navigation and sensor modules. In the example illustrated in FIG. 1C the control unit 140 within the V2X equipment 130 includes a processor 140*a*, a memory 140*b*, an input module 140*c*, an output module 140*d* and a radio module 140*e*. The processor 140*a* may be coupled to the memory 140*b*, which may store processor-executable instructions that when executed by the processor 140*a* cause a control unit 140 to perform V2X functionality addressed in various embodiments.

The control unit 140 may include functionality and connections to modules configured to control the operation of the vehicle 101. In some embodiments, the control unit 140 may be coupled to and configured to control drive control components 172*a*, navigation components 172*b*, and one or more sensors 144-170 of the vehicle 101. The processor 140*a* may further be configured with processor-executable instructions to control maneuvering, navigation, and/or other operations of the vehicle 101, including operations of various embodiments.

The radio module 140*e* may be communicatively coupled to the control unit 140, and include one or more modems, one or more radios, and one or more antenna (all not shown) configured to wireless communications using a variety of communication protocols and technologies. In particular, the radio module 140*e* may be configured to support wireless communications with other vehicles and IHS entities using V2X wireless communication protocols. In some embodiments, the radio module 140*e* may be configured to support wireless communications with wireless wide area networks (WWAN), including cellular networks.

As illustrated in FIG. 1C, the radio module 140*e* may be configured to exchange signals (e.g., sending MBR messages) via V2X communication links 120 with RSUs 108, which may forward messages and receive responses from an IHS backbone network 110. The radio module 140*e* may also be configured to transmit and receive data via WWAN communication links, such as with a cellular network base station 112 for communicating with remote servers (e.g., a server controlled by an owner of proprietary sensor data 70) via the networks core network and/or the Internet 114. The radio module 140*e* may further enable the vehicle's control unit 140 to communicate with other V2X-equipped vehicles 16 through V2X wireless communication links 124, such as to send and receive BSMs, and send and receive MBR messages. The radio module 140*e* may be configured to receive outgoing messages (e.g., MBR reports) from the processor 140*a* and to provide received information to the processor 140*a* and/or the navigation unit 172*b*.

A number of different cellular and mobile communication services and standards are available or contemplated in the future, all of which may in the radio module 140*e* in various embodiments. Vehicle-to-vehicle communications (e.g., 20) and vehicle-to-RSUs may use any of various V2X communication protocols. WWAN communications that may be used by V2X equipment 130 to transmit proprietary sensor data via secure (e.g., VPN) and non-V2X communication links may include any of: third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The input module 140*c* may receive sensor data from one or more vehicle sensors 172*c* as well as electronic signals from other components, including the drive control components 172*a* and the navigation components 172*b*. The output module 140*d* may communicate with or activate various components of the vehicle 101, including the drive control components 172*a*, the navigation components 172*b*, and the sensor(s) 172*c*.

The control unit 140 may be coupled to the drive control components 172*a* to control physical elements of the vehicle 101 related to maneuvering and navigation of the vehicle, such as the engine, motors, throttles, steering elements, flight control elements, braking or deceleration elements, and the like. The drive control components 172*a* may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 172*b*, and may receive data from the navigation components 172*b* and be configured to use such data to determine the present position and orientation of the vehicle 101, as well as an appropriate course toward a destination. The navigation components 172*b* may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 172*b* may include radio navigation receivers for receiving navigation beacons or other signals from radio nodes, such as Wi-Fi access points, cellular network sites, radio station, remote computing devices, other vehicles, etc. Through control of the drive control elements 172*a*, the processor 140*a* may control the vehicle 101 to navigate and maneuver. The processor 140*a* and/or the navigation components 172*b* may be configured to communicate with a network element such as a server in a communication network (e.g., the core network 114) via the wireless communication link 122, 126 to receive commands to control maneuvering, receive data useful in navigation, provide real-time position reports, and assess other data.

The control unit 140 may be coupled to one or more sensors 144-170 as described with reference to FIGS. 1A-1B, and may be configured to provide a variety of sensor data to the processor 140*a*.

While the control unit 140 is described as including separate components, in some embodiments some or all of the components (e.g., the processor 140*a*, the memory 140*b*, the input module 140*c*, the output module 140*d*, and the radio module 140*e*) may be integrated in a single device or module, such as an SOC processing device. Such an SOC processing device may be configured for use in vehicles and be configured, such as with processor-executable instructions executing in the processor 140*a*, to perform operations of navigation and collision avoidance using local dynamic map (LDM) data when installed in a vehicle.

Figure 1D:
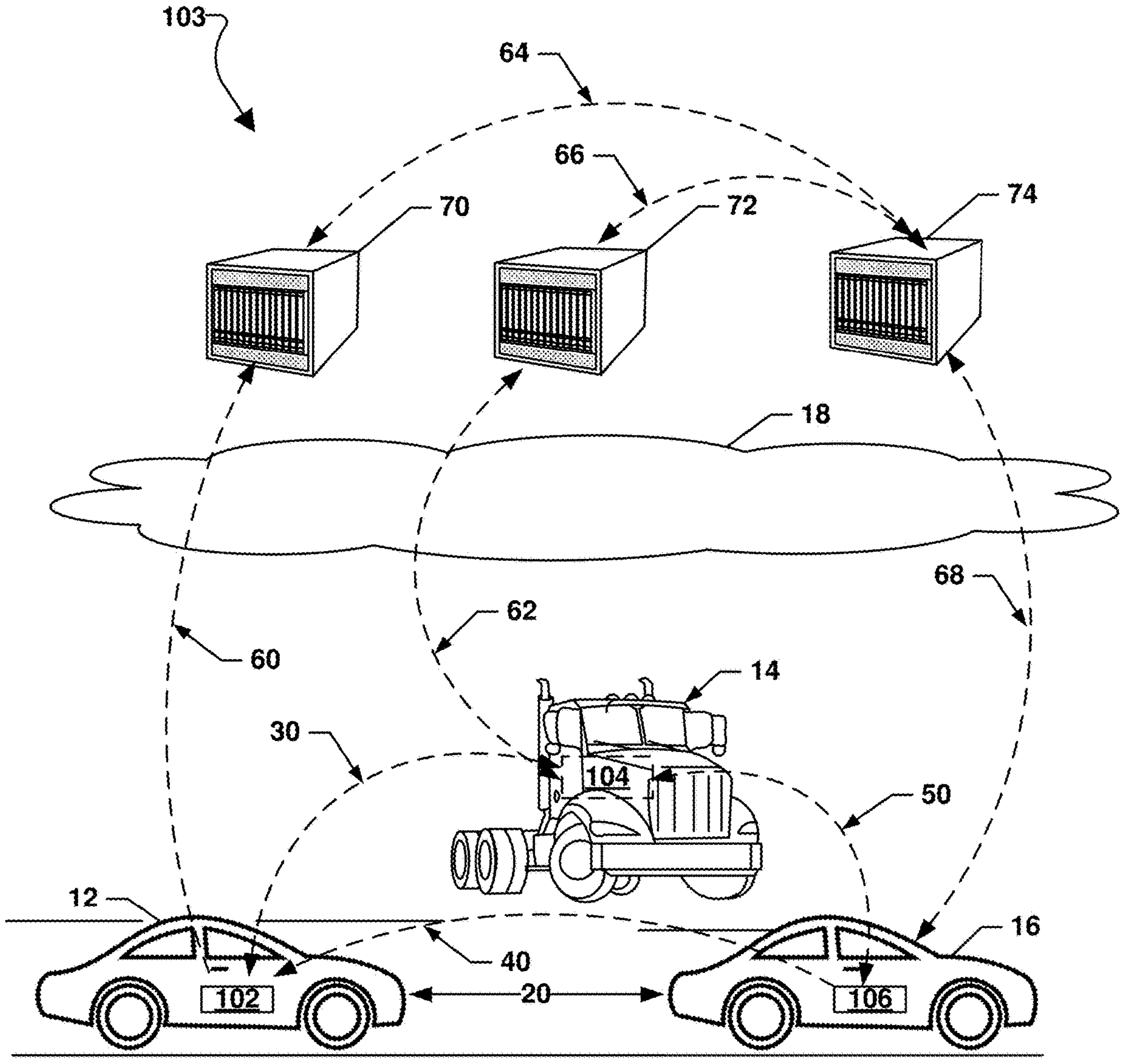
FIG. 1D is a schematic block diagram illustrating a subset of a V2X communication system suitable for implementing various embodiments.

FIG. 1D illustrates a portion of a V2X system 103 including three vehicles, 12, 14, 16. In the illustrated example, each vehicle 12, 14, 16 includes V2X onboard equipment 102, 104, 106, respectively, that are configured to periodically broadcast BSMs via vehicle-to-vehicle communication links 30, 40, 50 for receipt and processing by other vehicles' onboard equipment (e.g., 102, 104, 106). By sharing the vehicle location, speed, direction, braking, and other information, vehicles can maintain safe separation and identify and avoid potential collisions. For example, a trailing vehicle 12 receiving BSMs via a vehicle-to-vehicle communication link 40 from a leading vehicle 16 can determine the speed and location of the vehicle 16, which in turn enables vehicle 12 to match the speed and maintain a safe separation distance 20. By being informed through BSMs transmitted via a vehicle-to-vehicle communication link 40 when the leading vehicles 16 applies the brakes, the V2X equipment 102 in the trailing vehicle 12 can apply brakes simultaneously to maintain the safe separation distance 20 even when the leading vehicle 16 stops suddenly.

As another example, the V2X equipment 104 within the truck vehicle 14 may receive BSMs from the two vehicles 12, 16 via vehicle-to-vehicle communication links 30, 50, and thus be informed that the truck vehicle 14 should stop at an intersection to avoid a collision. Each of the vehicle V2X on-board equipment 102, 104, 106 may communicate with one another using V2X and/or other close proximity communication protocols.

In view of the safety purposes of V2X messages, V2X equipment 102, 106 may be configured to detect misbehavior conditions (e.g., information within BSMs that conflicts with other information available to the V2X equipment). When misbehavior conditions are detected, the V2X equipment 102, 106 may generate and transmit MBR messages to inform other vehicles 12, 16, 14 and the IHS processing entities, including a misbehavior managing authority 74, about the conditions.

In some instances, an MBR message may be transmitted to a misbehavior managing authority 74 through V2X communication links, such as to an RSU that forwards the message via an IHS backend network 18 (e.g., an IHS network, cellular networks, WiFi access points, etc.). In some instances, an MBR may be received from a vehicle, such as from vehicle 16, in a direct communication 68 to the remote misbehavior managing authority 74. The remote misbehavior managing authority 74 may then relay the MBR received from the vehicle 16 to one or more original equipment manufacturer (OEM) servers 70, 72 via communication links 64, 66 for validation of encrypted sensor data or encrypted proprietary information included in sensor data as described herein. In some instances, an MBR or proprietary sensor data supporting the MBR may first be transmitted to a MBR pre-processing unit such as an OEM servers 70, 72 for decryption and analysis through communication links 64, 66 before a confirmation report is forwarded to the misbehavior managing authority 74 through communication links 64, 66 as described herein. In the various communication paths, the OEM servers 70, 72 may provide a confirmation report to the misbehavior managing authority 74 via communication links 64, 66 as described herein.

Figure 2:
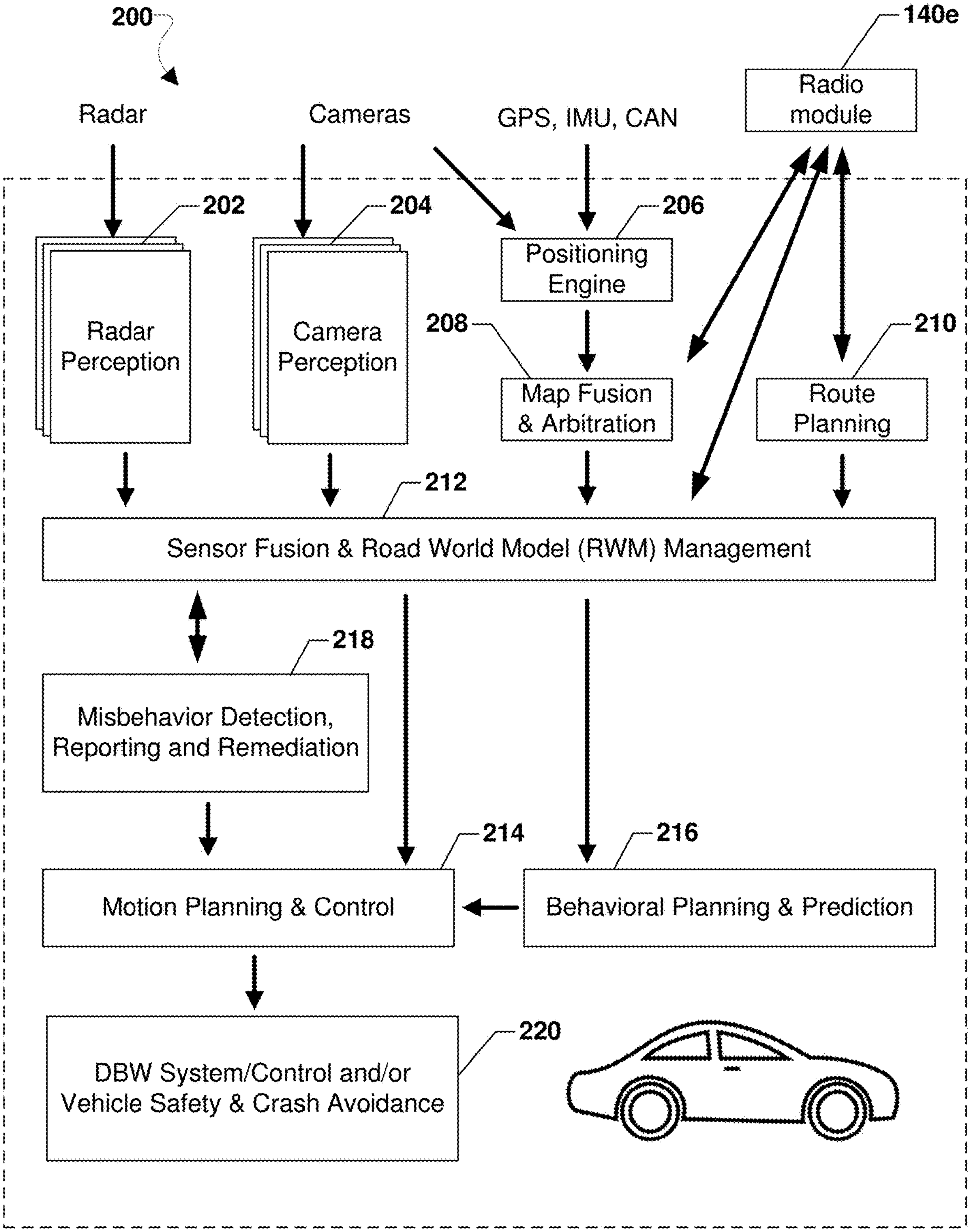
FIG. 2 is a software module diagram illustrating functional modules or layers that may execute in V2X equipment implementing various embodiments.

FIG. 2 is a component block diagram illustrating functional modules of an example misbehavior management functionality stack 200 of software functions executing within the control unit 140 of V2X equipment 130 in various embodiments. The misbehavior management functionality stack 200 may include various subsystems, communication elements, computational elements, computing devices or units which may be utilized within a vehicle 101, as well as determining whether a misbehavior condition exists. With reference to FIGS. 1A-2, the various computational elements, computing devices or units within misbehavior management functionality stack 200 may be implemented within a system of interconnected devices or subsystems that communicate data and commands to each other (e.g., indicated by the arrows in FIG. 2) within the V2X equipment. In some implementations, the various computational elements, computing devices or units within misbehavior management functionality stack 200 may be implemented within a single computing device, such as separate threads, processes, algorithms or computational elements. Therefore, each subsystem/computational element illustrated in FIG. 2 is also generally referred to herein as "layer" within a computational "stack" that constitutes the misbehavior management functionality stack 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The misbehavior management system stack 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, a behavioral planning and prediction layer 216, and a misbehavior detection, reporting and remediation layer 218. The layers 202-218 are merely examples of some layers in one example configuration of the misbehavior management system stack 200. In other configurations, other layers may be included, such as additional layers for other perception sensors (e.g., LIDAR perception layer, etc.), additional layers for planning and/or control, additional layers for modeling, etc., and/or certain of the layers 202-218 may be excluded from the misbehavior management system stack 200. Each of the layers 202-218 may exchange data, computational results and commands as illustrated by the arrows in FIG. 2. Further, the misbehavior management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The misbehavior management system stack 200 may output vehicle control commands or signals to the drive by wire (DBW) system/control unit and/or a vehicle safety and crash avoidance unit 220, which is a system, subsystem or computing device that may interface directly with vehicle steering, throttle and brake controls.

The configuration of the misbehavior management system stack 200 and DBW system/control unit 220 illustrated in FIG. 2 is merely an example configuration and other configurations of a vehicle management system and other vehicle components may be used. As an example, the configuration of the misbehavior management system stack 200 and DBW system/control unit 220 illustrated in FIG. 2 may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 158, 160), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 158, 160) and/or any other available sensor, such as radars, LIDARs, etc.

The misbehavior management functionality stack 200 may include or be coupled to a vehicle wireless communication subsystem 140*e*. The wireless communication subsystem 140*e* may be configured to communicate with other vehicle computing devices and highway communication systems, such as via vehicle-to-vehicle (V2V) communication links and/or to remote information sources, such as cloud-based resources, via cellular wireless communication systems, such as 5G networks. In various embodiments, the wireless communication subsystem 140*e* may communicate with other V2X system participants via wireless communication links to receive V2X messages as well as sensor data that may support a conclusion that a misbehavior condition is detected.

The map fusion and arbitration layer 208 may access sensor data received from other V2X system participants and receive output received from the positioning engine layer 206 and process the data to further determine the position of the vehicle 101 within the map, such as location within a lane of traffic, position within a street map, etc. sensor data may be stored in a memory (e.g., memory 312). For example, the map fusion and arbitration layer 208 may convert latitude and longitude information from GPS into locations within a surface map of roads contained in the sensor data. GPS position fixes include errors, so the map fusion and arbitration layer 208 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize sensor data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from V2V communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 101, as well as refined location and state information of other vehicles and objects in the vicinity of the vehicle 100, to the motion planning and control layer 214, the behavior planning and prediction layer 216 and/or devices remote from the vehicle 101, such as a data server, other vehicles, etc., via wireless communications, such as through C-V2X connections, other wireless connections, etc.

As a further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator. Examples of such vehicle descriptors may include: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 101. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 101. For example, based on route planning information, refined location in the roadway information, and relative locations and motions of other vehicles, the motion planning and control layer 214 may verify and pass various control commands or instructions to the DBW system/control unit 220.

The misbehavior detection, reporting and remediation layer 218 may interact with one or more of the sensors 144-170 (e.g., via the radar perception layer 202 and camera perception layer 204), the sensor fusion and RWM management layer 212 to determine whether a misbehavior condition is detected, either within own vehicle sensors and controls or in information received from other vehicles, such as in BSMs received via the radio module 140*c*. In addition to detecting misbehavior conditions, the misbehavior detection, reporting and remediation layer 218 perform operations of various embodiments to generate MBR messages of detected misbehavior conditions for transmission via the radio module 140*e* as described herein. Further, the misbehavior detection, reporting and remediation layer 218 may receive remediation or mitigation instructions via the radio module 140*e* in response to transmitted MBR messages and implement instructions or reconfiguration commands as described herein.

The misbehavior detection, reporting and remediation layer 218 may detect misbehavior conditions by detecting inconsistencies or conflicts among information gathered by various sensors 144-170, the world model maintained by the sensor fusion and RWM management layer 212, and other-vehicle and IHS information received via the radio module 140*e* in the form of BSMs, roadway alert messages, and the like. For example, if a BSM received from another vehicle indicates a speed significantly different from speed indications detected by a radar sensor, the misbehavior detection, reporting and remediation layer 218 may determine that the other vehicle is exhibit a misbehavior condition. As another example, misbehavior detection, reporting and remediation layer 218 may detect a misbehavior condition when sensor data from vehicle sensors indicate a conflict or inconsistency of one or a few sensors, as could occur when a sensor malfunctions or is out of calibration. As another example, the misbehavior detection, reporting and remediation layer 218 may detect a misbehavior condition if another vehicle reports its position in a BSM that conflicts with sensor data from own vehicle sensors, such as radar, lidar and/or camera sensors.

To enable a misbehavior managing authority 74 to determine the cause and potential remediation of a reported misbehavior condition, the MBR message generated by the misbehavior detection, reporting and remediation layer 218 may include the sensor data that provided the basis or supported the detection of the misbehavior condition within the information included in the MBR. In various embodiments, sensor data that includes proprietary information may be encrypted as described herein. In some embodiments, the misbehavior detection, reporting and remediation layer 218 may encrypt the sensor data as described herein. In some embodiments, misbehavior detection, reporting and remediation layer 218 may receive encrypted sensor data or encrypted proprietary information included in sensor data, such as from a sensor processor, as also described herein.

The DBW system/control unit 220 may receive the commands or instructions from the motion planning and control layer 214 and translate such information into mechanical control signals for controlling wheel angle, brake and throttle of the vehicle 100. For example, the DBW system/control unit 220 may respond to the computed steering wheel command angle by sending corresponding control signals to the steering wheel controller.

In various embodiments, the wireless communication subsystem 140*e* may communicate with other V2X system participants via wireless communication links to transmit basic safety messages that may include, for example, sensor data, position data, vehicle data and data gathered about the environment around the vehicle by onboard sensors. Such information may be used by other V2X system participants to update stored sensor data for relay to other V2X system participants.

In various embodiments, the misbehavior management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

In some embodiments, the misbehavior management system stack 200 may pass various data or instructions to a vehicle safety and crash avoidance function 220 rather than a DBW system/control unit. In such embodiments, the behavioral planning and prediction layer 216 and/or sensor fusion and RWM management layer 212 may output data to the vehicle safety and crash avoidance system 220. For example, the sensor fusion and RWM management layer 212 may output sensor data as part of refined location and state information of the vehicle 101 provided to the vehicle safety and crash avoidance system 220. The vehicle safety and crash avoidance system 220 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 220. The vehicle safety and crash avoidance system 220 may use the behavior models and/or predictions related to the motion of other vehicles to make safety determinations relative to the vehicle 101 and/or occupants of the vehicle 101.

In various embodiments, the vehicle safety and crash avoidance system 220 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 220 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 220 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
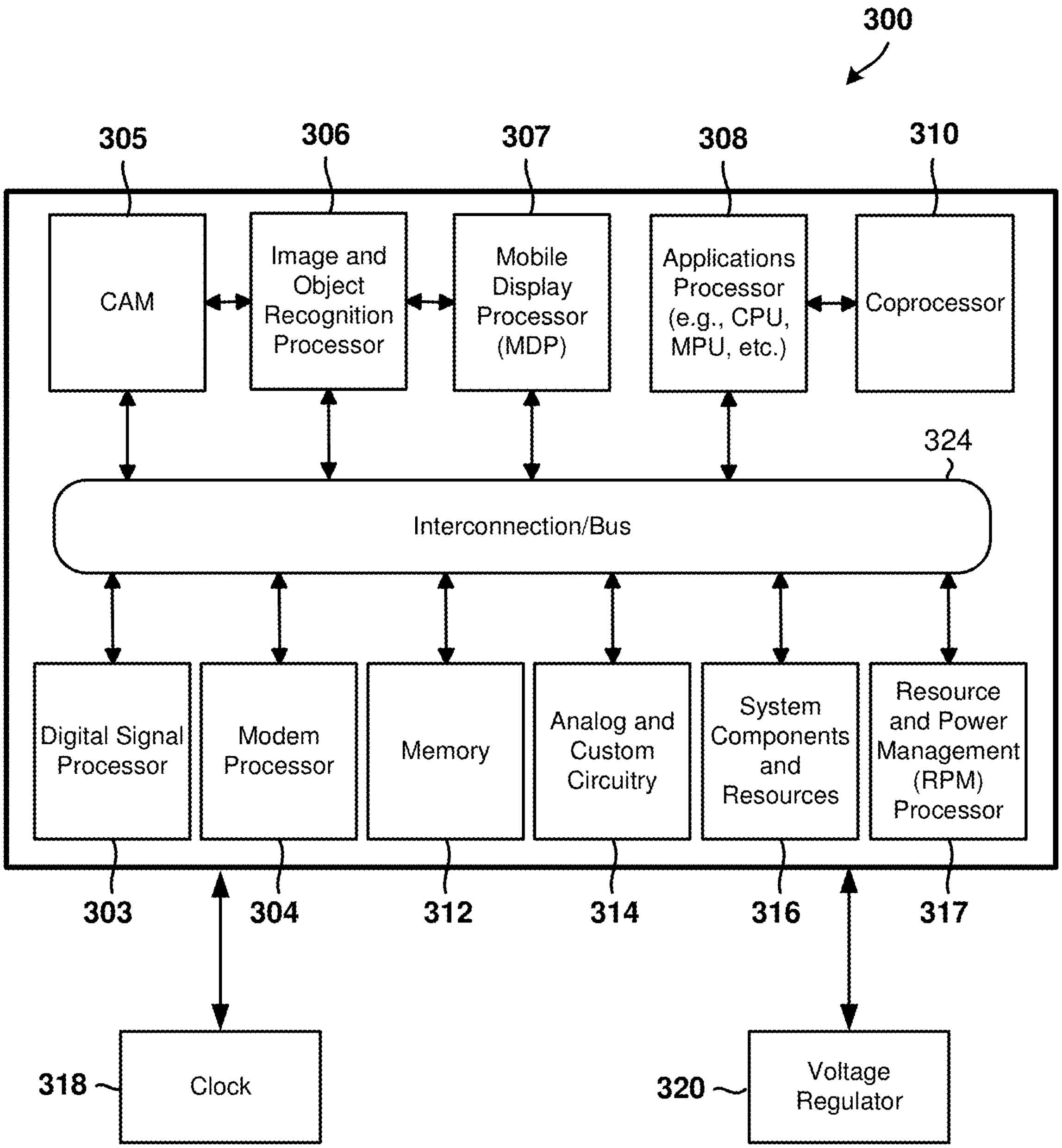
FIG. 3 is a block diagram illustrating components of a system on chip processing device suitable for use in V2X equipment implementing various embodiments.

FIG. 3 illustrates an example SOC architecture of a processing device SOC 300 suitable for implementing various embodiments in V2X equipment 130 as well as in server computing devices. With reference to FIGS. 1A-3, a server (e.g., 70, 72, 74) and V2X equipment 130, particularly a control unit 140, may include a processing device SOC 300 that integrates a number of heterogeneous processors, and supporting circuitry integrated in a single integrated chip or chip set. For example, an SOC 300 may include a digital signal processor (DSP) 303, a modem processor 304, an image and object recognition processor 306, a mobile display processor 307, an applications processor 308, and a resource and power management (RPM) processor 317. A processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 158, 160) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, and other vehicle sensors. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs). Memory elements 312 include but are not limited to DDR, LPDDR, GDDR, WIDEIO, RAM, SRAM, DRAM, P-RAM, R-RAM, M-RAM, STT-RAM, and embedded DRAM.

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4A:
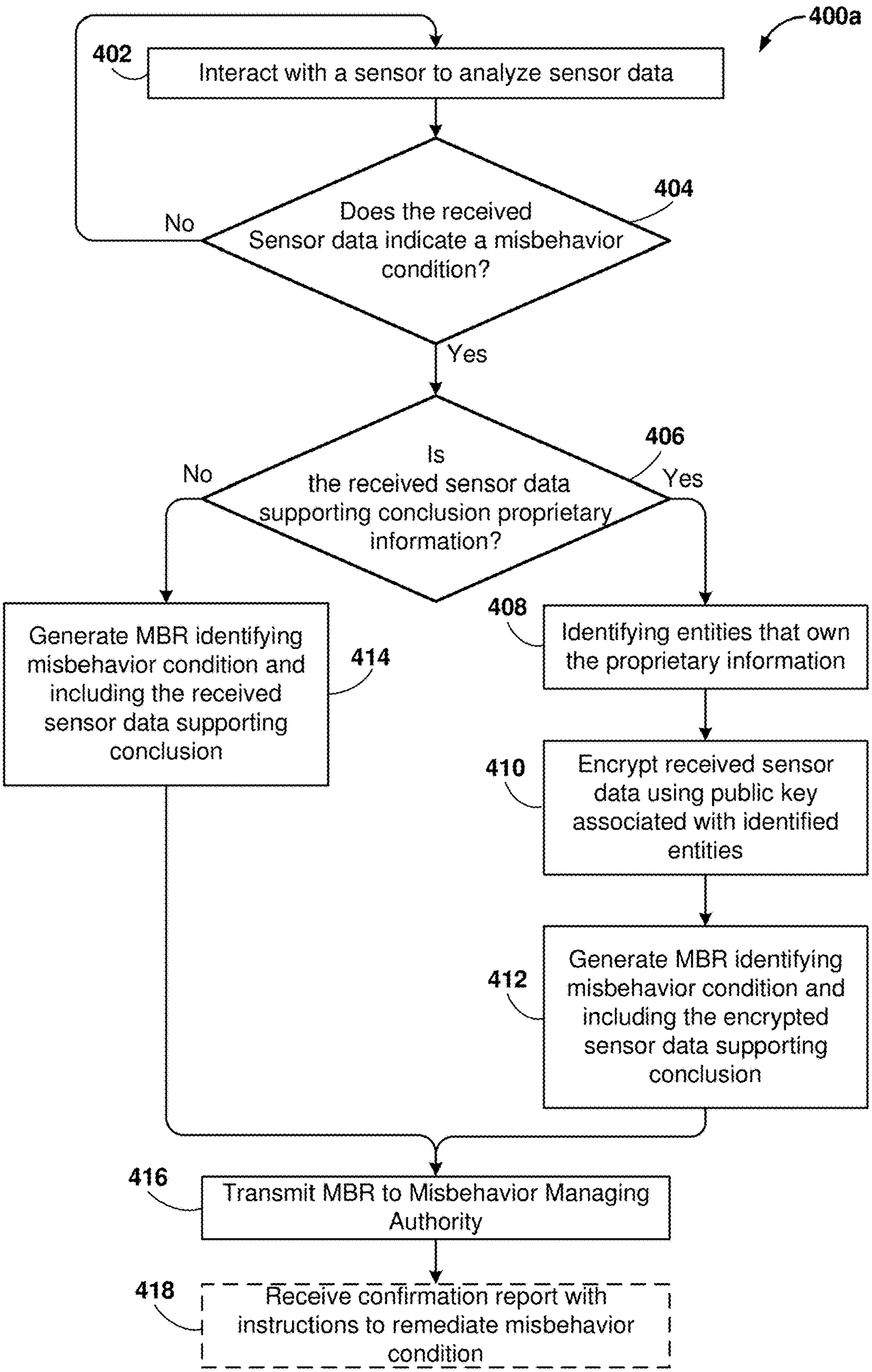
FIG. 4A is a process flow diagram illustrating operations of an embodiment method performed by a V2X equipment processing device to protect proprietary information supporting a determination of a misbehavior condition in a V2X system.

FIG. 4A is a process flow diagram illustrating operations of a method 400*a* for protecting proprietary sensor data that may be included with an MBR. With reference to FIGS. 1A-4A, the operations of the method 400*a* may be performed by a processing device (e.g., 140*a*, 300) in V2X equipment 130 of a V2X system participant (e.g., vehicle 16 in FIG. 1D).

In block 402, the processor may interact with a plurality of the V2X equipment sensors that relate to the control maneuvering, navigation, and/or other operations of the V2X system participant (e.g., vehicle 16). The V2X equipment sensors may include any of the various sensors discussed with respect to FIGS. 1A and 1B above. Means for performing functions of the operations in block 402 may include a processor or processing device (e.g., 140*a*, 300) and vehicle sensors (e.g., 144-170).

In determination block 404, the V2X equipment processor may determine whether the received sensor data indicates a misbehavior condition. For example, if the V2X equipment processor determines that all of the sensor data is consistent with each other, the V2X equipment processor may determine that the received sensor data does not indicate a misbehavior condition (i.e., determination 404=No). Means for performing functions of the operations in block 404 may include a processor or processing device (e.g., 140*a*, 300) and vehicle sensors (e.g., 144-170).

In response to determining that the received sensor data does not indicate a misbehavior condition (i.e., determination 404=No), the V2X equipment processor may return to block 402 to monitor and receive sensor data.

However, in instances in which sensor data is inconsistent or contrary to information from other sources (e.g., information from other vehicles, RSUs, etc.), the V2X equipment processor may determine that the received sensor data indicates a misbehavior condition (i.e., determination block 404=Yes). For example, if the V2X equipment speedometer sensor indicated that the vehicle (e.g., vehicle 16) is travelling at 40 mph, but the V2X equipment camera sensor data and GPS sensor data do not detect movement, the speedometer sensor is clearly malfunctioning and the V2X equipment may detect a misbehavior condition indicating that the speedometer sensor (i.e., determination block 404="Yes").

As an example, the V2X equipment processor may receive Received Signal Strength Indication (RSSI) as sensor data from a radio in block 402. RSSI data is a measure of the energy received by a radio at a particular frequency (or on a particular channel or resource). Since RSSI is related to the distance of the originator of the received radio signal, the RSSI may be used as sensor data to determine whether a V2X system participant is at a reported distance from a location that an originator of the received radio signal. The V2X equipment processor may determine that a misbehavior condition has occurred in response to determining that the RSSI and other sensor data (e.g., GPS data) are inconsistent with one another (i.e., determination block 404="Yes").

In response to the V2X equipment processor determining that the sensor data indicates that a misbehavior condition has occurred (i.e., determination block 404="Yes"), the V2X equipment processor may determine whether the sensor data obtained from one or more sensors indicating or supporting a conclusion that a misbehavior condition has occurred is or includes proprietary information in determination block 406. In some embodiments, the proprietary or confidential nature of certain sensor data may be identified as part of configuration data of the V2X equipment processor, such as part of initial configuration settings. In some embodiments, a sensor may indicate to the processor that its sensor data includes or is proprietary or confidential. In some embodiments, as part of the operations in determination block 406, the processor may determine how much of the sensor data is proprietary or confidential, such as the entire data set, sensor data minus metadata or header information, or meta data regarding the sensor but not the sensor data. Means for performing functions of the operations in determination block 406 may include a processor or processing device (e.g., 140*a*, 300).

As an example, the OEM of a radio chipset may desire to keep raw RSSI values confidential in order to protect proprietary information regarding how the chipsets perform under certain conditions. Thus, the OEM may wish to protect this raw data information from being contained in MBRs that are transmitted to the misbehavior managing authority. In that case, the OEM may request that RSSI raw data not be included in an MBR unless such data is encrypted. Without the RSSI sensor data, a misbehavior managing authority may have a difficult time confirming whether a reported misbehavior condition depending on RSSI data is accurate. Thus, in this example, the V2X equipment processor may determine that received RSSI data supporting the conclusion that a misbehavior condition has occurred is or includes proprietary information (i.e., determination block 406="Yes").

While the above example is described using RSSI data as the proprietary information. Other sensor data sets may be deemed proprietary information. For example, some sensors may implement machine learning to derive their sensor data. The various parameters and weighting factors used in the machine learning algorithm may be deemed proprietary information. Other sensors may also generate proprietary information as determined by the OEM of the sensor.

In response to determine that the received sensor data supporting the conclusion that a misbehavior condition has occurred is not proprietary information (i.e., determination block 406="No"), the V2X equipment processor may generate an MBR in block 414. Referring to the example discussed above, the sensor data (e.g., speedometer, GPS, and camera data) that is used to support a determination that a misbehavior condition has occurred is fairly common, open and public and thus there is no need to protect such sensor data. Put another way, the sensor data (e.g., speedometer, GPS, and camera data) that is used to support a determination that a misbehavior condition has occurred is not confidential or proprietary. The MBR generated in block 414 may include the identified misbehavior condition and the sensor data that supports the conclusion that the identified misbehavior condition has occurred without encrypting the sensor data. Means for performing functions of the operations in block 414 may include a processor or processing device (e.g., 140*a*, 300).

In response to determining that the received sensor data supporting the conclusion that a misbehavior condition has occurred is or includes proprietary information (i.e., determination block 406="Yes"), the V2X equipment processor may identifying each entity that owns an instance of proprietary information included in the sensor data indicating that a misbehavior condition has occurred in block 408. In the example discussed above, in which the RSSI is the sensor data that supports the conclusion that a misbehavior condition has occurred, the V2X equipment processor may identify the OEM of the radio chipset as the owner of the proprietary information. In some embodiments, the sensor data itself may include an identifier that allows the V2X equipment processor to identify the owner of the proprietary information. Means for performing functions of the operations in block 408 may include a processor or processing device (e.g., 140*a*, 300).

In some implementations, multiple sensor data sets may be used to support a conclusion that a misbehavior condition has occurred, and, there may be a plurality of sensor data sets that include proprietary information. In addition, such sensors may be manufactured by multiple OEMs so there may be a plurality of owners of the plurality of sensor data sets that include proprietary information. In such embodiments, the V2X equipment processor may identify each of the plurality of proprietary data owners in block 408. Each of the identified plurality of proprietary data owners may be associated with their respective sensor data sets.

In block 410, the V2X equipment processor may encrypt proprietary information included in sensor data obtained from one or more sensors indicating that a misbehavior condition has occurred. In some embodiments, the V2X equipment processor may encrypt proprietary information included in sensor data in response to determining that the sensor data obtained from one or more sensors indicating that a misbehavior condition has occurred includes proprietary information. When multiple entities owning instances of proprietary information included in the sensor data indicating that a misbehavior condition has occurred identified in block 408, the respective sensor data sets may be encrypted instances of proprietary information included in the sensor data using a public key associated with the entity that owns respective instances of proprietary information in block 410. In some cases, one OEM may own proprietary information in multiple different sensor data, in which case the multiple instances of proprietary sensor data may be encrypted using the public key of the OEM. In some cases, multiple OEMs may own different instances of proprietary sensor data, in which case each instance of proprietary sensor data may be encrypted using the public key of each respective OEM. Thus, multiple sensor data sets may be each encrypted with a unique public key that is associated with the respective proprietary data owner of the sensor data in some embodiments in block 410. Means for performing functions of the operations in block 410 may include a processor or processing device (e.g., 140*a*, 300).

In block 412, the V2X equipment processor may generate a misbehavior report (MBR) identifying the misbehavior condition and including information regarding the encrypted proprietary information. In some embodiments, the generated MBR may include the identified misbehavior condition as well as the encrypted sensor data or encrypted proprietary information included in sensor data that supports the conclusion that the identified misbehavior condition has occurred. By encrypting the proprietary sensor data, the MBR may be transmitted to the misbehavior managing authority while protecting the proprietary nature of the supporting data. In some embodiments described in more detail with reference to FIG. 4D, the MBR my include a field indicating that sensor data indicating that a misbehavior condition has occurred is or will be transmitted separately, in which case the V2X system participant may transmit the encrypted proprietary information over a separate secure communication link. In this manner, the misbehavior managing authority may be provided with information regarding the sensor data sufficient to confirm whether the misbehavior condition occurred without compromising the proprietary nature of the supporting data during transmission of the MBR. Means for performing functions of the operations in block 412 may include a processor or processing device (e.g., 140*a*, 300).

In block 416, the V2X equipment processor may transmit the MBR generated in either block 412 or 414, which includes the identified misbehavior condition and the sensor data, either encrypted or not encrypted, that supports the conclusion that the identified misbehavior condition has occurred, to a misbehavior managing authority (e.g., 74) for analysis. Means for performing functions of the operations in block 416 may include a processor or processing device (e.g., 140*a*, 300) and a wireless transmitter (e.g., 140*c*).

In some embodiments, the V2X equipment processor may receive a confirmation report from the misbehavior managing authority in response to transmitting the generated MBR in block 418. In some embodiments, the confirmation report may include instructions as to how the V2X equipment processor may remediate the misbehavior condition. For example, the confirmation report may include a software patch or updated firmware that may correct the errors occurring in the sensor that may give rise to the misbehavior condition. As another example, the confirmation report may instruct the V2X equipment processor to ignore data from a particular sensor that is misbehaving. In another example, the confirmation report may instruct the V2X system participant to be serviced so that the sensor can be repaired or replaced.

Figure 4B:
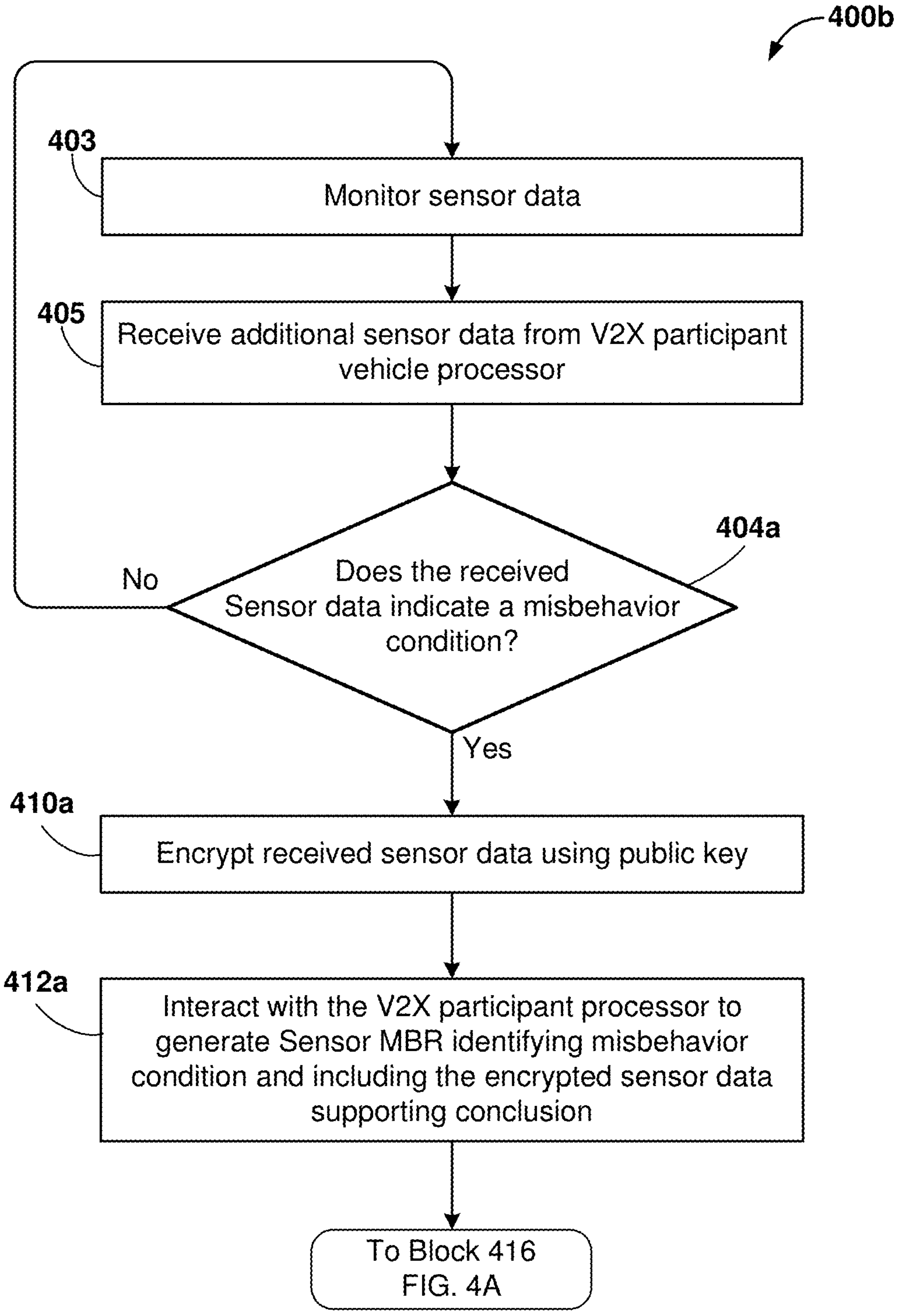
FIG. 4B is a process flow diagram illustrating operations of another embodiment method performed by a sensor processor to protect proprietary information supporting a determination of a misbehavior condition in a V2X system.

FIG. 4B is a process flow diagram illustrating operations of an alternative embodiment method 400*b* to protect proprietary information supporting a determination of a misbehavior condition in a V2X system. With reference to FIG. 4B, in some embodiments the V2X equipment sensor may be sophisticated equipment that itself includes a sensor processor capable of performing a number of the operations discussed above with respect to FIG. 4A. The use of the sensor processor to perform a number of the operations discussed above with respect to FIG. 4A, as opposed to the V2X equipment processor, allows the OEM of the sensor processor to further protect the OEM's proprietary information from disclosure and potential public dissemination. For example, by encrypting the proprietary sensor data before such data is received by the V2X equipment processor, the OEM may provide another level of protection to the proprietary information by restricting access to the raw sensor data to the sensor only.

In block 403, a processor within a sensor may monitor its sensor data. As an illustrative example, the radio that provides the RSSI data described above may also include a processor (i.e., sensor processor) configured to monitor its own sensor data in block 403. Means for performing functions of the operations in block 403 may include a processing device (e.g., 300) in one or more sensors (e.g., 144-170).

In block 405, the sensor processor may receive additional sensor data from other V2X system participant sensors that may be relayed to the sensor processor from the V2X equipment processor. Means for performing functions of the operations in block 403 may include a processing device (e.g., 300) in one or more sensors (e.g., 144-170).

Based on its own proprietary sensor data and the received additional V2X system participant sensor data, the sensor processor may determine whether a misbehavior condition has occurred in determination block 404*a*.

In response to determining that all of the monitored and received sensor data is consistent with each other, the sensor processor may determine that the received sensor data does not indicate a misbehavior condition (i.e., determination block 404*a*=No). In response to determining that the monitored and received sensor data does not indicate a misbehavior condition (i.e., determination block 404*a*=No), the sensor processor may continue to monitor and receive sensor data in block 403.

In response to determining that a misbehavior condition has occurred (i.e., determination block 404*a*="Yes"), the sensor processor may encrypt the proprietary sensor data that supports the conclusion that the misbehavior condition has occurred in block 410*a*. For example, the sensor processor may determine that the RSSI data indicates that the current position data of the V2X participant in which the sensor processor is installed is inconsistent with the GPS position data that may be relayed from the GPS sensors via the V2X equipment processor. In this example, the radio processor may encrypt the RSSI data using the public key associated with the OEM of the radio. Means for performing functions of the operations in block 410*a* may include a processing device (e.g., 300) in one or more sensors (e.g., 144-170).

In block 412*a*, the V2X equipment processor may generate the MBR including the encrypted sensor data or encrypted proprietary information included in sensor data. By encrypting the RSSI data, the sensor processor (i.e., radio processor) may interact with the V2X equipment processor to generate the MBR in block 412*a* to include the identified misbehavior condition as well as the encrypted RSSI data. In addition, the generated MBR by the V2X equipment processor may also include the V2X equipment GPS data (i.e., additional sensor data). Such additional sensor data may be beneficial for the misbehavior managing authority to confirm that the misbehavior condition has occurred. In some embodiments, the additional sensor data (i.e., sensor data that is obtained by the V2X equipment processor may be identified as proprietary to a different entity, and thus may also be encrypted by the other V2X system participant sensor using a public key associated with the different entity). Means for performing functions of the operations in block 416 may include a processing device (e.g., 300) in one or more sensors (e.g., 144-170).

Figure 4C:
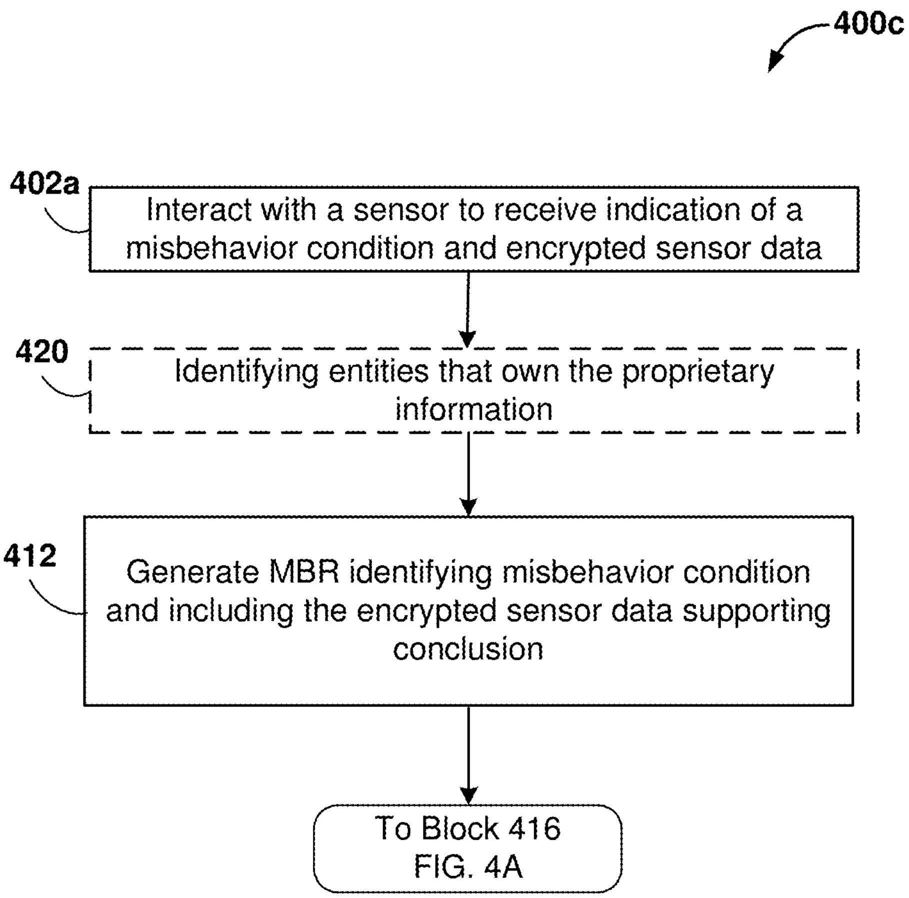
FIG. 4C is a process flow diagram illustrating operations of another embodiment method performed by a V2X equipment processing device to protect proprietary information supporting a determination of a misbehavior condition in a V2X system.

FIG. 4C is a process flow diagram illustrating operations of another embodiment method 400*c*. With reference to FIGS. 1A-4C, the method 400*c* may be performed by a V2X equipment processor (e.g., 140*a*, 300) in conjunction with the sensor that performs method 400*b* described with reference to FIG. 4B.

After generating the MBR, the V2X equipment processor may transmit the MBR to the misbehavior managing authority 74 in block 416.

In block 402*a*, the V2X equipment processor may interact with a V2X system participant sensor to receive an indication that a misbehavior condition has occurred as well as encrypted sensor data or encrypted proprietary information included in sensor data from the V2X system participant sensor in which the encrypted sensor data or encrypted proprietary information included in sensor data supports the conclusion that the misbehavior condition has occurred. Means for performing functions of the operations in block 416 may include a processor or processing device (e.g., 140*a*, 300) and one or more sensors (e.g., 144-170).

In some embodiments, in optional block 420, the V2X equipment processor may identify the entities that own the encrypted proprietary sensor data. For example, the encrypted data included in the sensor may be encoded with an unencrypted identifier that allow the V2X equipment processor to identify the proprietary information owner. In some embodiments, the V2X equipment processor may identify the owner of proprietary information by detecting which sensor originated the sensor MBR. In such embodiments, the OEM of the sensor may be identified as the owner of proprietary information. In some embodiments, the V2X equipment processor may expedite the confirmation process by transmitting the sensor MBR directly to the OEM servers for receipt, subsequent decryption and analysis of the MBR for confirmation as described with reference to FIG. 6. Means for performing functions of the operations in block 420 may include a processor or processing device (e.g., 140*a*, 300) and one or more sensors (e.g., 144-170).

In block 412, the V2X equipment processor may generate an MBR that includes the identified misbehavior condition as well as the encrypted sensor data or encrypted proprietary information included in sensor data that was encrypted by the sensor processor in block 410*a* as described. In some embodiments, the V2X equipment processor may further supplement the encrypted sensor data or encrypted proprietary information included in sensor data in the MBR with additional sensor data from other V2X system participant sensors. In some embodiments, such additional sensor data or proprietary information included in sensor data may also be encrypted with other public keys either by the V2X equipment processor and/or by the other V2X system participant sensors. Means for performing functions of the operations in block 420 may include a processor or processing device (e.g., 140*a*, 300) and one or more sensors (e.g., 144-170).

The V2X equipment (e.g., 130), particularly a control unit 140, may then transmit the MBR to the misbehavior managing authority in block 416 as described. By encrypting the proprietary sensor data, the MBR may be transmitted to the misbehavior managing authority in block 416 while protecting the proprietary nature of the supporting data.

Figure 4D:
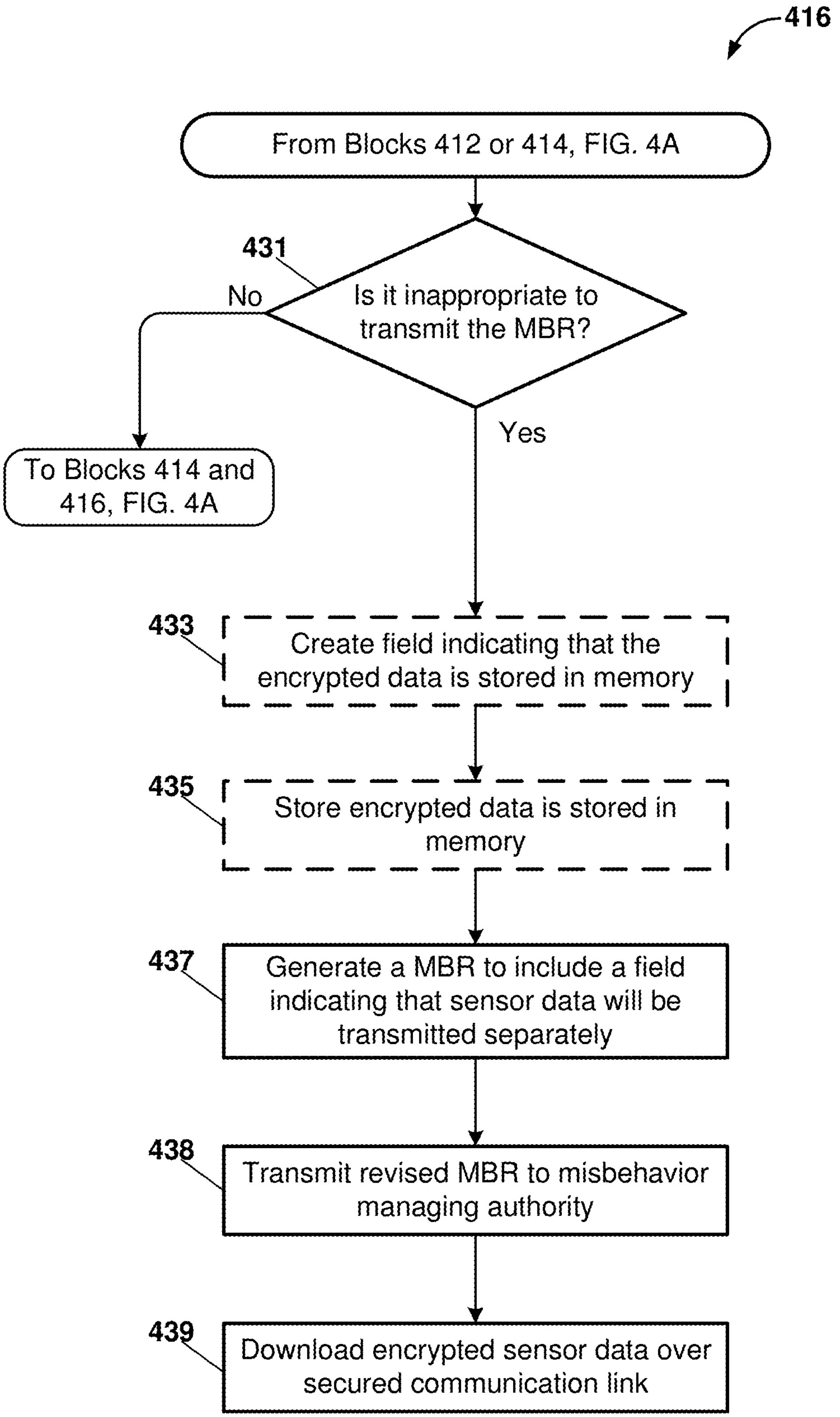
FIG. 4D illustrates a further embodiment method that may be performed by a V2X equipment processing device.

In some situations the encrypted sensor data or encrypted proprietary information included in sensor data may result in a generated MBR that is too large to transmit. In some situations, the encrypted sensor data or encrypted proprietary information included in sensor data may include proprietary information that is too sensitive to transmit, even as encrypted data, over an unsecured communication link. To accommodate such situations, some embodiments may implement an alternative transmitting operation that differs from the transmitting operations in block 416 of the method 400*a*. FIG. 4D illustrates an embodiment transmitting operations in block 416 that may be performed by a processor or processing device (e.g., 140*a*, 300) within V2X equipment (e.g., 130), such as a control unit 140.

With reference to FIGS. 1A-4D, in the embodiment of the operations in block 416 illustrated in FIG. 4D, the V2X equipment processor may receive the generated MBR in block 412 or block 414 of the method 400*a* as described.

In determination block 431, the V2X equipment processor may determine whether it is inappropriate to transmit the MBR including encrypted proprietary information to the misbehavior managing authority. There may be various reasons that it would be inappropriate to transmit the MBR. In some embodiments, determining whether it is inappropriate to transmit to a misbehavior report to the misbehavior managing authority may include determining that the generated misbehavior report is inappropriate to transmit in response to determining that the encrypted proprietary information that supports the conclusion that the misbehavior condition has occurred is too large to transmit in a misbehavior report. In some embodiments, determining whether the generated misbehavior report is inappropriate to transmit to the misbehavior managing authority may include determining that the generated misbehavior report is inappropriate to transmit in response to determining that the encrypted proprietary information that supports the conclusion that the misbehavior condition has occurred should not be transmitted over an unsecure wireless communication link. Means for performing functions of the operations in determination block 431 may include a processor or processing device (e.g., 140*a*, 300).

In response to determining that it is appropriate to transmit the MBR (i.e., determination block 431="No"), the V2X equipment processor may generating the misbehavior report to include the encrypted proprietary information in block 414 of the method 400*a* as described, and transmit the generated MBR to the misbehavior managing authority in block 416 of the method 400*a* as described.

In response to determining that it is inappropriate to transmit the MBR including encrypted proprietary information to the misbehavior managing authority (i.e., determination block 431="Yes"), the V2X equipment processor may generate the misbehavior report to include a field indicating that sensor data indicating that a misbehavior condition has occurred will be transmitted separately (i.e., not in the MBR) in block 437. In some embodiments, the field may indicate that the encrypted sensor data or encrypted proprietary information included in sensor data that supports the conclusion that the misbehavior condition will be transmitted via a separate and secure communication link to the misbehavior managing authority. In some embodiments, the field may indicate that the encrypted sensor data or encrypted proprietary information included in sensor data that supports the conclusion that the misbehavior condition will be transmitted via a separate and secure communication link to the owner of the encrypted sensor data or encrypted proprietary information included in sensor data.

In some embodiments, the sensor generating proprietary sensor data or the V2X equipment processor may store the proprietary sensor data in memory of the V2X system as part of the operations in block 437. In some embodiments, encrypted sensor data or encrypted proprietary information included in sensor data may be stored in memory, such as memory coupled to the V2X equipment processor. In some embodiments, raw (i.e., unencrypted) sensor data may be stored in memory coupled to the sensor or a sensor processor. In some embodiments, the proprietary information may remain stored in V2X system memory or sensor memory until the V2X system receives a notification from the misbehavior managing authority or the sensor OEM providing remedial actions in response to the MBR as described herein, after which the proprietary information may be deleted from memory (i.e., V2X system memory and/or sensor memory).

In block 437, the V2X equipment processor may generate a revised MBR that identifies the misbehavior condition that has occurred and includes the field that indicates that the encrypted sensor data or encrypted proprietary information included in sensor data will be communicated separately to the owner of the proprietary information, such as stored via a virtual private network (VPN) communication line and/or in an identified memory location in a remote memory. Means for performing functions of the operations in block 437 may include a processor or processing device (e.g., 140*a*, 300).

In block 438, the revised MBR may be transmitted to the misbehavior managing authority. Upon receipt, the misbehavior managing authority may seek to obtain the encrypted sensor data or encrypted proprietary information included in sensor data that supports the conclusion that the misbehavior condition occurred from memory. In an optional operation, the V2X system processor may download the encrypted sensor data or encrypted proprietary information included in sensor data to a remote location memory (e.g., proprietary information owner's server (70, 72)) via a secured communication link (e.g., a wired link). Means for performing functions of the operations in block 416 may include a processor or processing device (e.g., 140*a*, 300) and a wireless transmitter (e.g., 140*c*).

In an optional embodiment illustrated in FIG. 4D, the V2X equipment processor may deliver proprietary sensor data or encrypted proprietary information included in sensor data to the owner of the sensor data separate from the MBR by storing the sensor data or proprietary information in a memory associated with or controlled by the owner of the sensor data via a separate secure communication link. In such embodiments, the V2X equipment processor may store encrypted sensor data or encrypted proprietary information included in sensor data in a remote memory using a secure communication link (e.g., a VPN connection) in optional block 433. To inform the owner of the location of the stored sensor data or encrypted proprietary information included in sensor data, in optional block 435 the processor may generate the field included in the MBR that indicate that the encrypted sensor data or encrypted proprietary information included in sensor data that supports the misbehavior condition conclusion has been stored in a particular location (e.g., a memory address) within the remote memory. For example, the V2X equipment processor may access a remote server over a secured communication link store the encrypted sensor data encrypted proprietary information included in sensor data in a remote memory maintained or accessible via the server in optional block 433, and then generate the field in optional block 435 to include in the MBR that identifies where the encrypted sensor data encrypted proprietary information included in sensor data is stored. For example, the V2X system participant may transfer the stored encrypted sensor data encrypted proprietary information included in sensor data from the V2X system participant memory through a download process over a secured wired communication link (e.g., a VPN connection) to a server controlled by the owner of the proprietary information, and generate the field in optional block 433 to inform the server of the memory location where the encrypted sensor data may be obtained. In this manner, encrypted information securely transmitted to a remote memory under the control of the owner of the proprietary information, while the MBR is transmitted to the misbehavior managing authority over insecure communication links. In this embodiment, the operations in block 439 may not be performed because the encrypted sensor data or encrypted proprietary information included in sensor data was downloaded in optional block 435. Means for performing functions of the operations in optional block 433 may include a processor or processing device (e.g., 140*a*, 300) and a wireless transmitter (e.g., 140*c*). Means for performing functions of the operations in block 416 may include a processor or processing device (e.g., 140*a*, 300).

Figure 5:
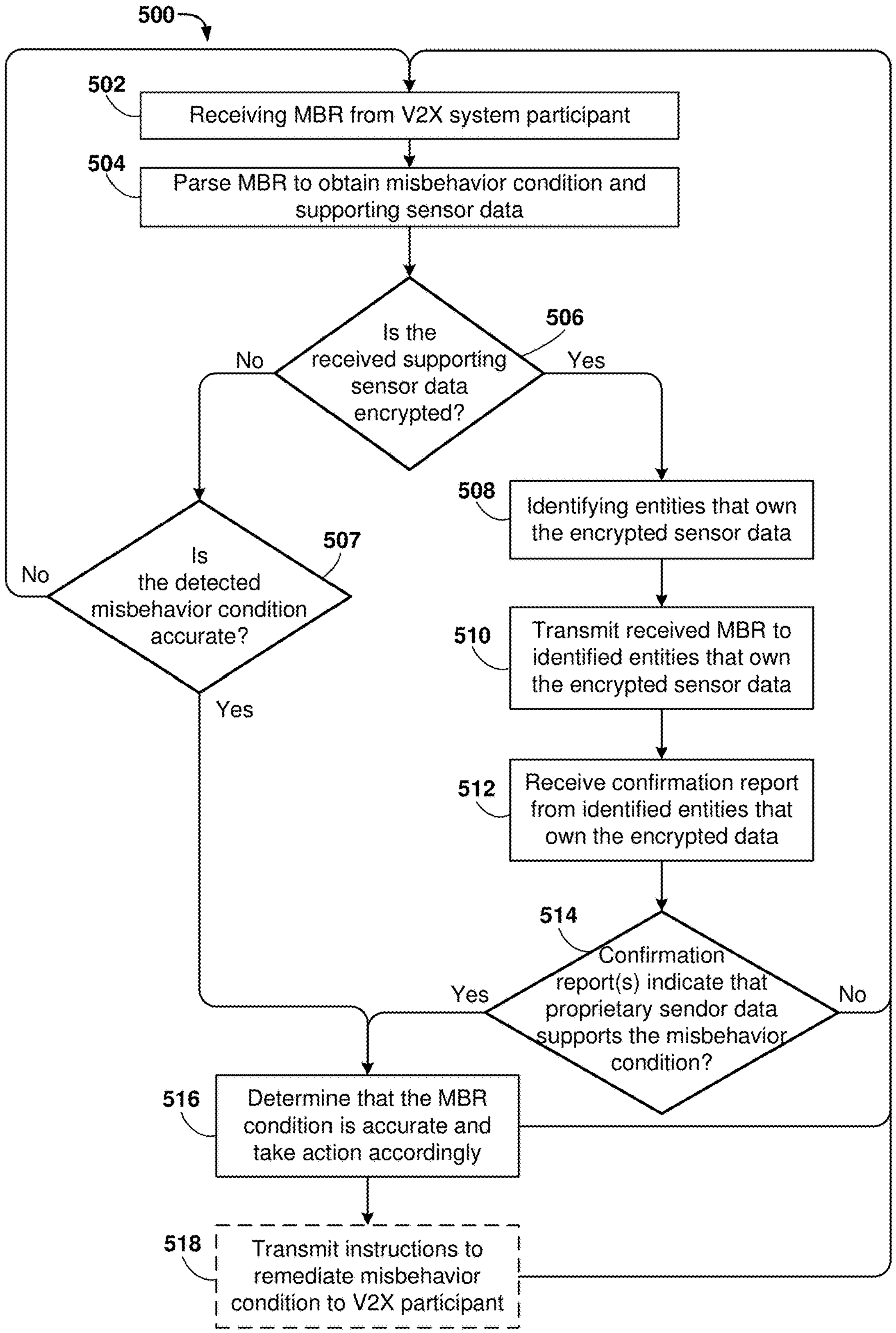
FIG. 5 is a process flow diagram illustrating a method that may be performed by a misbehavior managing authority server to protect proprietary information supporting a determination of a misbehavior condition in a V2X system in accordance with various embodiments.

FIG. 5 is a process flow diagram illustrating operations of a method 500 that may be performed by a misbehavior managing authority server processor to protect proprietary information supporting a determination of a misbehavior condition in a V2X system in accordance with various embodiments. With reference to FIGS. 1A-5, the operations of the method 500 may be performed by a processing device (e.g., 300) of a server (e.g., 74, 700).

In block 502, the misbehavior managing authority server processor may receive an MBR from a V2X system participant (e.g., vehicle 16). The MBR may be received via communication links of an IHS, such as relayed by a RSU through a network of the IHS. Means for performing functions of the operations in block 502 may include a processing device (e.g., 300) and a network access port (e.g., 707).

In block 504, the misbehavior managing authority server processor may obtain sensor data from the MBR indicating that a misbehavior condition has occurred. In some embodiments, the misbehavior managing authority server processor may parse the MBR to obtain the sensor data identified misbehavior condition. In some embodiments, the MBR may obtain from the MBR a field indicating that the sensor data was or will be transmitted separately by the V2X system participant. Means for performing functions of the operations in block 504 may include a processing device (e.g., 300).

In determination block 506, the misbehavior managing authority server processor may determine whether any of the supporting sensor data that is received in the MBR includes encrypted sensor data or encrypted proprietary information included in sensor data. For example, this determination may involve determining whether the obtained sensor data is readable. As another example, this determination may be made by reading information or metadata included in the MBR indicating that includes sensor data is encrypted. In embodiments or situations in which the MBR includes a field indicating that the sensor data was or will be transmitted separately by the V2X system participant the operations in determination block 506 may not be performed. Means for performing functions of the operations in determination block 506 may include a processing device (e.g., 300).

In response to determining that the received MBR does not contain any encrypted sensor data or encrypted proprietary information included in sensor data (i.e., determination block 506="No"), the misbehavior managing authority server processor may analyze the accompanying sensor data to determine whether the detection of the misbehavior condition is accurate in determination block 507. Means for performing functions of the operations in block 518 may include a processing device (e.g., 300).

In response to determining that a misbehavior condition has occurred in the MBR is not accurate (i.e., determination block 507="No"), the misbehavior managing authority server processor may await the receipt of the next MBR in block 502. For example, the misbehavior managing authority server may ignore the received MBR.

In response to determining that the received MBR does contain encrypted sensor data or encrypted proprietary information included in sensor data (i.e., determination block 506="Yes"), the misbehavior managing authority server processor may identify the entities that own the encrypted proprietary sensor data in block 508. As described, the MBR may include unencrypted identifiers of the proprietary information that allow the misbehavior managing authority server processor to identify the entities that own the encrypted proprietary sensor data. Means for performing functions of the operations in block 508 may include a processing device (e.g., 300).

The misbehavior managing authority server processor may transmit the received MBR, including the encrypted proprietary information, to the identified entities that own the encrypted sensor data or encrypted proprietary information included in sensor data in block 510, for decryption by the entities own the encrypted sensor data or encrypted proprietary information included in sensor data as discussed in more detail with reference to FIG. 6. In this manner, the proprietary information may remain encrypted while in possession by the misbehavior managing authority server processor. Decryption and assessment of the proprietary information may be left to the identified owner of the proprietary information. Thus, the proprietary information may be protected from disclosure to a non-authorized entity while processing of the encrypted sensor data or encrypted proprietary information included in sensor data is performed by the party that owns the proprietary information. Means for performing functions of the operations in block 510 may include a processing device (e.g., 300) and a network access port (e.g., 707).

After the MBR is transmitted to the identified owner(s) of the proprietary information, the misbehavior managing authority server processor may await and then receive a confirmation report from the identified entities that own the encrypted sensor data or encrypted proprietary information included in sensor data in block 512. As described with reference to FIG. 6, the owner(s) of the proprietary sensor data may receive the MBR, decrypt proprietary information included in the sensor data and analyze decrypted proprietary information to determine whether the conclusion made by the V2X equipment processor that a misbehavior condition has occurred is accurate. Thus, the confirmation report(s) received from an entity or entities that own proprietary sensor data may include an indication of whether or not the sensor data confirms or supports the misbehavior condition reported in the MBR. For example, the received response may include information regarding the extent to which the evaluated sensor data supports or conflicts with the reported misbehavior condition. In some embodiments, the identified owner(s) of the proprietary information may include in the confirmation report an instruction for the V2X system participant to remediate or mitigate the impact of the misbehavior condition. Means for performing functions of the operations in block 512 may include a processing device (e.g., 300) and a network access port (e.g., 707).

In determination block 514, the misbehavior managing authority server processor may determine whether the received confirmation report includes an indication or information or an indication that the sensor data evaluated by the proprietary information owner supports the misbehavior condition reported in the MBR. Means for performing functions of the operations in determination block 502 may include a processing device (e.g., 300).

In response to determining that the confirmation report does not support or conflicts with the misbehavior condition (i.e., determination block 514="No"), the misbehavior managing authority server may await the receipt of the next MBR in block 502. In some embodiments, the misbehavior managing authority server may also take actions appropriate in response to determining that the MBR message is not reliable, such as informing other V2X participants that the MBR message should be ignored.

In response to determining that the conclusion that a misbehavior condition has occurred in the MBR is accurate (i.e., determination block 507="Yes") or in response to determining that the confirmation report supports support or does not conflict with the misbehavior condition identified in the MBR (i.e., determination block 514="Yes"), the misbehavior managing authority server determine that the MBR is valid or reliable and that the misbehavior condition has occurred. In response, the misbehavior managing authority server may take an action that is appropriate depending upon the identified misbehavior condition. For example, the misbehavior managing authority server may inform V2X participants about the misbehavior condition so that V2X equipment may take actions appropriately. Means for performing functions of the operations in block 516 may include a processing device (e.g., 300) and a network access port (e.g., 707).

In some embodiments that misbehavior managing authority server may prepare instructions for remediating or mitigating the misbehavior condition and transmit those instructions to the reporting V2X equipment in optional block 516. In instances in which an owner of proprietary sensor data provides remediation or mitigation instructions, the misbehavior managing authority server may transmit those instructions to the reporting V2X equipment in optional block 516. Means for performing functions of the operations in optional block 518 may include a processing device (e.g., 300) and a network access port (e.g., 707).

In optional block 518, the misbehavior managing authority server may transmit the instructions to the misbehavior condition to the V2X system participant for remediating or mitigating the impact of the reported misbehavior condition. For example, the misbehavior managing authority server may transmit instruction directing the V2X system participants V2X equipment to ignore a misbehaving sensor. As another example, if the sensor OEM provided remedial action (e.g., to recalibrate or repair a misbehaving sensor), the misbehavior managing authority server may transmit those instructions in optional block 518.

After taking actions in block 516 and/or transmitting remediation or mitigation instructions to the V2X system participant in optional block 518, the misbehavior managing authority server processor may await the receipt of the next MBR in block 502.

Figure 6:
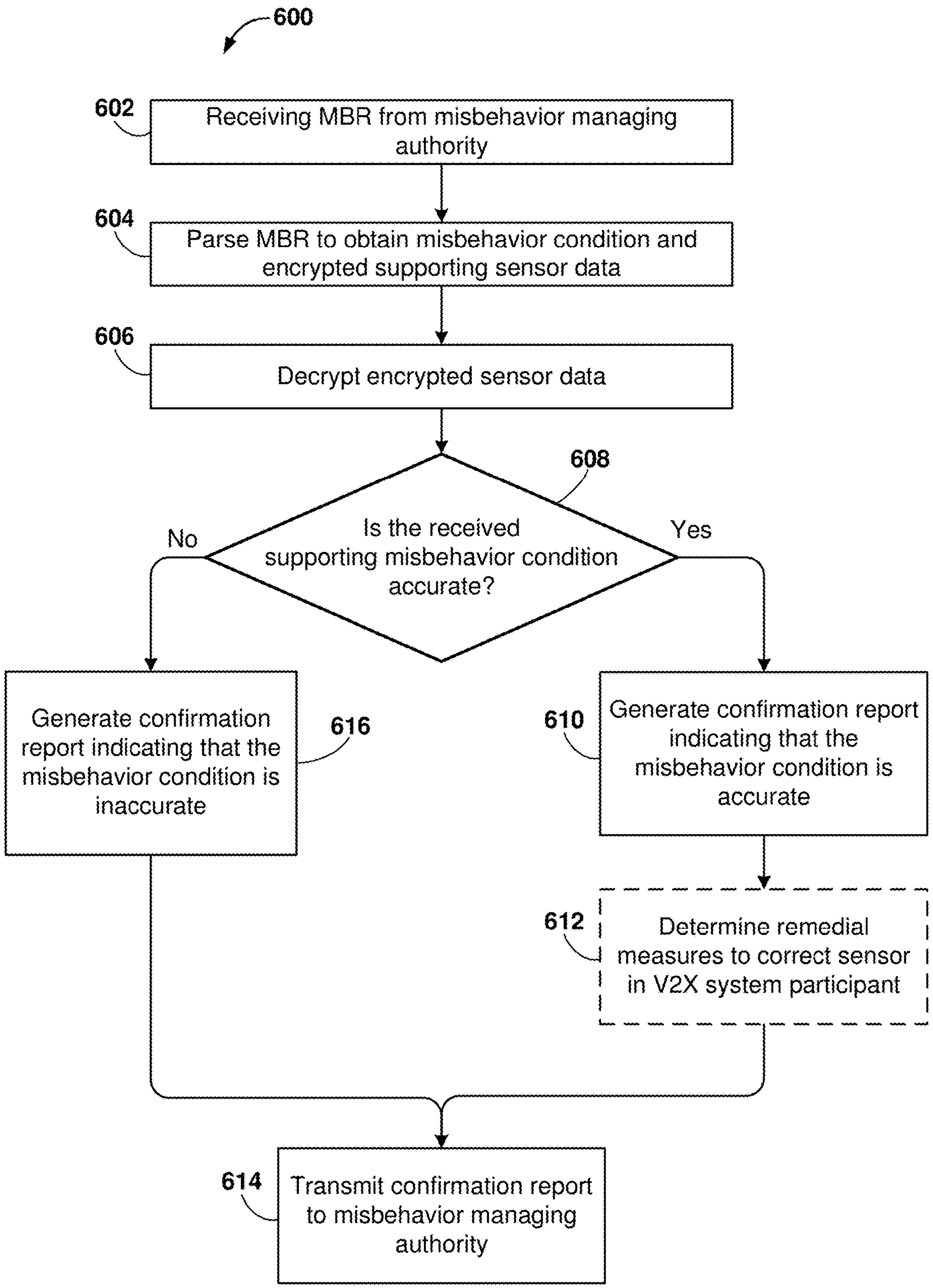
FIG. 6 is a process flow diagram illustrating a method that may be performed by a proprietary information owner's server to protect proprietary information supporting a determination of a misbehavior condition in a V2X system in accordance with some embodiments.

FIG. 6 is a process flow diagram illustrating operations of method 600 performed by a proprietary information owner's server to protect proprietary information supporting a determination of a misbehavior condition in a V2X system in accordance with some embodiments. With reference to FIGS. 1A-6, the operations of the method 600 may be performed by a processing device (e.g., 300) of a server (e.g., 70, 72, 700) controlled by the owner of the proprietary information ("the proprietary information owner's server").

In block 602, a proprietary information owner's server may receive the MBR from a misbehavior managing authority server. In some embodiments, the receive MBR may include encrypted sensor data or encrypted proprietary information included in sensor data. In some embodiments, the MBR may include a field indicating that encrypted sensor data or encrypted proprietary information included in sensor data was transmitted separately, in which case the server processor may receive the encrypted sensor data or encrypted proprietary information included in sensor data from the misbehavior managing authority server in some embodiments, or determine from the field how the server can obtain the proprietary sensor data, such as recalling the data from a memory location specified in the field, receiving the sensor data via a secure communication link with the V2X equipment, and/or other suitable secure communication process. Means for performing functions of the operations in determination block 602 may include a processing device (e.g., 300) of a server (e.g., 70, 72, 700) and a network access port (e.g., 707).

In block 604, the proprietary information owner's server may obtain identification of a misbehavior condition from the received misbehavior report and information regarding encrypted sensor data or encrypted proprietary information included in sensor data indicating that the misbehavior condition has occurred. In some embodiments, the proprietary information owner's server may parse the MBR to obtain the identified misbehavior condition that the V2X system participant has concluded has occurred as well as the sensor data that supports the conclusion. In some embodiments or cases, the proprietary information owner's server may read a field indicating that proprietary sensor data has been or will be transmitted separately to the server, and use information in that field to obtain the sensor data, such as receiving encrypted sensor data or encrypted proprietary information included in sensor data over a secure communication link with the reporting V2X equipment. Means for performing functions of the operations in determination block 604 may include a processing device (e.g., 300) of a server (e.g., 70, 72, 700).

In block 606 the proprietary information owner's server may decrypt the encrypted sensor data or encrypted proprietary information included in sensor data that supports the conclusion that the misbehavior condition has occurred, which was included in the MBR, received from the V2X equipment that generated the MBR through a separate secure communication link, or otherwise obtained by the server in block 602 and/or 604. Means for performing functions of the operations in determination block 606 may include a processing device (e.g., 300) of a server (e.g., 70, 72, 700).

With the sensor data obtained and decrypted, the proprietary information owner's server may analyze relevant sensor data and determining whether the misbehavior condition in the MBR is accurate or supported at least in part by decrypted proprietary information in determination block 608. In some cases, the server may evaluate whether the obtained and decrypted sensor data or decrypted proprietary information includes information consistent with the misbehavior conclusion identified in the MBR. In some cases, the server may evaluate the sensor data to assess whether the data is accurate, reliable, and/or indicative of misbehavior by the sensor. In some embodiments, the server may access other data accessible to/by the server, including but not limited to similar MBRs received from the same or other vehicles, telematic data, information from sensor vendors regarding known sensor issues or vulnerabilities, historic information related to the sensors or sensor data, and the like. Means for performing functions of the operations in determination block 608 may include a processing device (e.g., 300) of a server (e.g., 70, 72, 700).

In response to determining that the detection of the misbehavior condition is inaccurate or does not support the sensor data (i.e., determination block 608="No"), the proprietary information owner's server may generate a confirmation report indicating that the detection of the misbehavior condition is inaccurate or unreliable in block 616. Means for performing functions of the operations in determination block 616 may include a processing device (e.g., 300) of a server (e.g., 70, 72, 700).

In response to determining that the detection of the misbehavior condition is accurate or supported at least in part by the sensor data (i.e., determination block 608="Yes"), the proprietary information owner's server may generate a confirmation report indicating that the detection of the misbehavior condition is accurate or supported by sensor data in block 610. In some embodiments, the indication may be as simple as a binary (I/O) value that may be included in a reply message. Means for performing functions of the operations in determination block 610 may include a processing device (e.g., 300) of a server (e.g., 70, 72, 700).

In some embodiments, the proprietary information owner's server may determine remedial measures to address misbehavior of the sensor in the V2X system participant in optional block 612. For example, in block 612, the proprietary information owner's server may generate instructions for the V2X system participant to execute in order to correct operations the sensor in the V2X system participant (e.g., updating software, recalibrating the sensor, etc.). As another example, in block 612, the proprietary information owner's server may generate instructions for the V2X system participant to disconnect or ignore data from a misbehaving sensor, switch to accessing data from a backup or redundant sensor, or otherwise adjust configurations or operations in the V2X system participant to permit proper operations and avoid further MBR submissions. In some embodiments, information or instructions for remedial measures may be included in the confirmation report generated in block 610. In some embodiments, information or instructions for remedial measures may be transmitted to the V2X equipment in the reporting vehicle via a separate communication link (e.g., an over-the-air update or the like) in block 612. Means for performing functions of the operations in determination block 612 may include a processing device (e.g., 300) of a server (e.g., 70, 72, 700).

Following generation of a confirmation report in block 610 or 616, the proprietary information owner's server may transmit the confirmation report to the misbehavior managing authority server in block 614. For example, the server may reply to the forwarded MBR message via an Internet message (e.g., a hypertext transport protocol (HTTP) message) or other communication (e.g., email, etc.). Means for performing functions of the operations in determination block 614 may include a processing device (e.g., 300) of a server (e.g., 70, 72, 700) and a network access port (e.g., 707).

Figure 7:
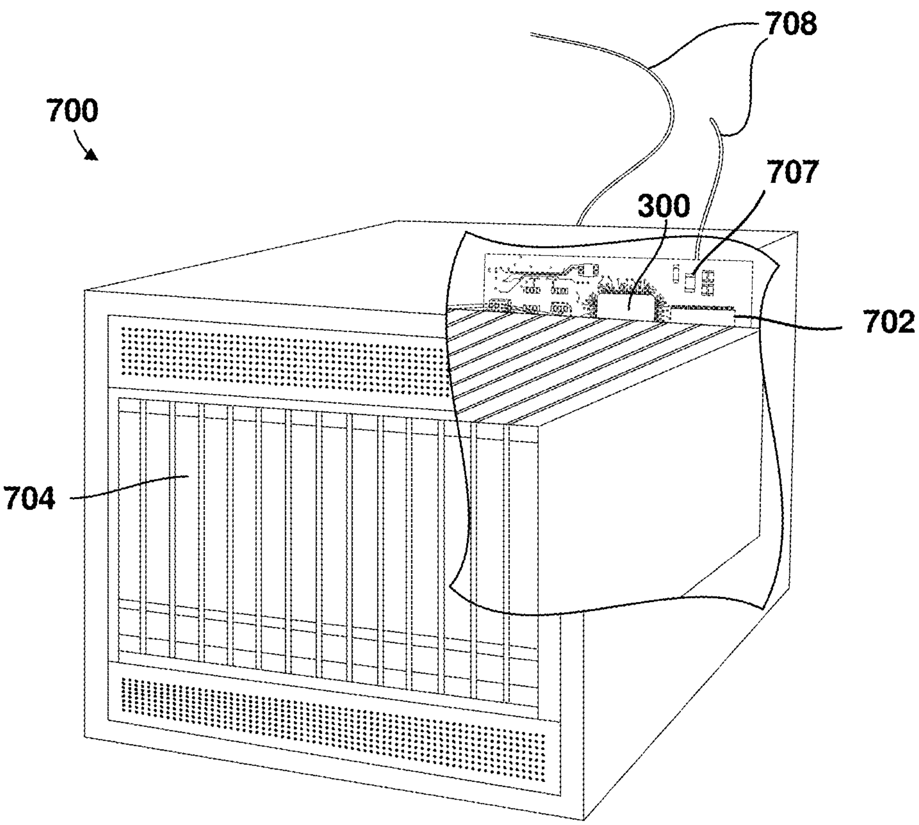
FIG. 7 is a component block diagram illustrating an example server suitable for use with various embodiments.

The various embodiments (including, but not limited to, embodiments described above with reference to FIGS. 5 and 6) may also include a misbehavior managing authority and Proprietary Information owners that utilize fixed computing systems, such as any of a variety of commercially available servers. An example server 700 is illustrated in FIG. 7. Such a server 700 typically includes one or more multicore processor assemblies 300 coupled to volatile memory 702 and a large capacity nonvolatile memory, such as a disk drive 704. As illustrated in FIG. 9, multicore processor assemblies 300 may be added to the server 700 by inserting them into the racks of the assembly. The server 700 may also include network access ports 707 coupled to the multicore processor assemblies 300 for establishing network interface connections with a network 708, such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

Figure 8:
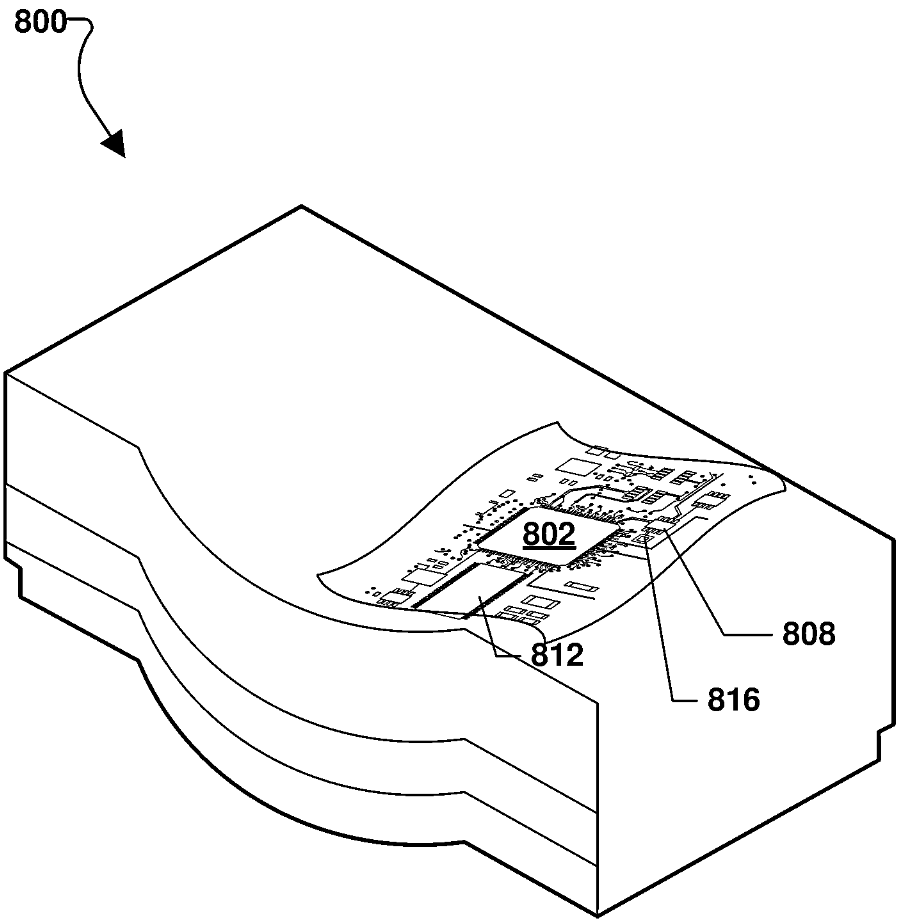
FIG. 8 is a component block diagram illustrating an example sensor suitable for use with various embodiments.

Various embodiments may be implemented in a wide variety of sensors 144-170, some of which may include a sensor processor, memory and other circuitry in a sensor module 800, an example of which is illustrated in FIG. 8. Such sensor modules 800 may include a processor 802 coupled to volatile memory 812. Additionally, sensor modules 800 may include sensor processing circuitry 808 for converting raw sensor data into digital format suitable for processing by the processor 802 and/or the V2X equipment processor 140A. Sensor modules 800 may also include a data transceiver 816 configured to communicate data from the sensor processor 802 to V2X equipment 130, such as to the processor (e.g., 140*c*, 300) of a control unit 140. The sensor modules 800 may be installed within a V2X system participant vehicle 12, 14, 16.

Implementation examples are described in the following paragraphs. While some of the following implementation examples are described in terms of example methods, further example implementations may include: the example methods discussed in the following paragraphs implemented in a V2X on-board unit, mobile device unit, mobile computing unit, stationary roadside unit, or another computing device including a processor configured to perform operations of the methods of the following implementation examples; the example methods discussed in the following paragraphs implemented by a V2X on-board unit, mobile device unit, mobile computing unit, stationary roadside unit, or another computing device including means for performing functions of the methods of the following implementation examples; and the example methods discussed in the following paragraphs may be implemented as a non-transitory processor-readable storage medium having stored thereon processor-executable instructions configured to cause a V2X on-board unit, mobile device unit, mobile computing unit, stationary roadside unit, or another computing device processor to perform the operations of the methods of the following implementation examples.

Example 1. A method of protecting proprietary information supporting a determination of a misbehavior conditions in a V2X system, including the operations of: interacting with a sensor to determine whether a misbehavior condition has occurred based on the received sensor data; determining whether the received sensor data that supports a conclusion that the misbehavior condition has occurred is or includes proprietary information; encrypting the received sensor data that supports the conclusion that the misbehavior condition has occurred in response to determining that the received sensor data is or includes proprietary information; generating a misbehavior report including the received sensor data that supports the conclusion that the misbehavior condition has occurred in response to determining that the misbehavior condition has occurred, wherein the received sensor data included in the misbehavior report is encrypted in response to determining that the received sensor data is or includes proprietary information; and transmitting the generated misbehavior report to a misbehavior managing authority.

Example 2. The method of example 1, further including: determining an entity that owns the proprietary information.

Example 3. The method of either of example 1 or 2, further including: determining whether the received sensor data that supports the conclusion that the misbehavior condition includes multiple instances of proprietary information such that different instances are owned by different entities; and determining each of the different entities that own respective different instances of the proprietary information.

Example 4. The method of example 3, wherein encrypting the received sensor data included in the misbehavior report in response to determining that the received sensor data that supports the conclusion that the misbehavior condition has occurred is or includes proprietary information includes encrypting the received sensor data using a public key associated with the different entities that own respective different instances of the proprietary information.

Example 5. The method of example 2, wherein transmitting the generated misbehavior report to the misbehavior managing authority includes: determining whether it is inappropriate to transmit the generated misbehavior report to the misbehavior managing authority; creating a field in the generated misbehavior report, wherein the field includes indicates that the sensor data supporting the conclusion that the misbehavior condition has occurred is stored in memory; storing the encrypted sensor data or encrypted proprietary information included in sensor data that supports the conclusion that the misbehavior condition has occurred in a V2X system participant memory; generating a revised misbehavior report that identifies the misbehavior condition that has occurred and includes the created field; transmitting the generated revised misbehavior report to the misbehavior managing authority; and downloading the stored encrypted sensor data or encrypted proprietary information included in sensor data that supports the conclusion that the misbehavior condition has occurred over a secured communication link.

Example 6. The method example 5, wherein determining whether the generated misbehavior report is inappropriate to transmit to the misbehavior managing authority comprises determining that the encrypted proprietary information that supports the conclusion that the misbehavior condition has occurred is too large to transmit.

Example 7. The method of example 5, wherein determining whether the generated misbehavior report is inappropriate to transmit to the misbehavior managing authority comprises determining that the encrypted proprietary information that supports the conclusion that the misbehavior condition has occurred should not be transmitted over an unsecured wireless communication link.

Example 8. The method of any of examples 5-7, wherein the field identifies the location that received the downloaded stored encrypted sensor data or encrypted proprietary information included in sensor data.

Example 9. The method of example 4, wherein encrypting the received sensor data using the public key associated with the each of the more than one entity that owns the proprietary information is performed by a sensor associated with the proprietary information.

Further example implementations may include example methods discussed in the following paragraphs implemented by a sensor processor, wherein the sensor may be an on-board unit, mobile device unit, mobile computing unit, or stationary roadside unit including a processor configured with processor-executable instructions to perform operations of the methods of the following implementation examples; the example methods discussed in the following paragraphs implemented by a sensor including means for performing functions of the methods of the following implementation examples; and the example methods discussed in the following paragraphs may be implemented as a non-transitory processor-readable storage medium having stored thereon processor-executable instructions configured to cause a sensor processor to perform the operations of the methods of the following implementation examples.

Example 10. A method of protecting proprietary information supporting a determination of a misbehavior conditions in a V2X system, including the operations of: monitoring sensor data; receiving additional sensor data; determining whether a misbehavior condition has occurred based on the monitored and received sensor data; encrypting the monitored sensor data that supports the conclusion that the misbehavior condition has occurred in response to determining that the received sensor data is or includes proprietary information; and interacting with a V2X equipment processor to generate a misbehavior report including the received sensor data that supports the conclusion that the misbehavior condition has occurred in response to determining that the misbehavior condition has occurred, wherein the received sensor data included in the misbehavior report is encrypted in response to determining that the received sensor data is or includes proprietary information.

Further example implementations may include example methods discussed in the following paragraphs implemented by a misbehavior managing authority server, including a processor configured with processor-executable instructions to perform operations of the methods of the following implementation examples; the example methods discussed in the following paragraphs implemented by a misbehavior managing authority server including means for performing functions of the methods of the following implementation examples; and the example methods discussed in the following paragraphs may be implemented as a non-transitory processor-readable storage medium having stored thereon processor-executable instructions configured to cause a misbehavior managing authority server processor to perform the operations of the methods of the following implementation examples.

Example 11. A method of protecting proprietary information supporting a determination of a misbehavior condition in a V2X system, including: receiving a misbehavior report from a V2X system participant; parsing the misbehavior report to obtain a conclusion that a misbehavior condition has occurred and sensor data that supports the conclusion that the misbehavior condition has occurred; determining whether the sensor data that supports the conclusion that the misbehavior condition has occurred includes encrypted sensor data or encrypted proprietary information included in sensor data; identifying an entity that owns the encrypted sensor data or encrypted proprietary information included in sensor data; transmitting the misbehavior report to the entity that owns the encrypted data; and receiving a confirmation report from the entity that owns the encrypted data, wherein the confirmation report indicates whether the misbehavior report is accurate.

Example 12. The method of example 11, wherein identifying an entity that owns the encrypted sensor data or encrypted proprietary information included in sensor data includes: determining whether the received sensor data that supports the conclusion that the misbehavior condition has occurred includes encrypted sensor data or encrypted proprietary information included in sensor data that is owned by more than one entity; and determining each of the more than one entity that owns the encrypted sensor data or encrypted proprietary information included in sensor data, wherein transmitting the misbehavior report to the entity that owns the encrypted sensor data or encrypted proprietary information included in sensor data includes transmitting the misbehavior report to each of the more than one entity that owns the encrypted sensor data or encrypted proprietary information included in sensor data.

Example 13. The method of example 12, wherein receiving a confirmation report from the entity that owns the encrypted sensor data or encrypted proprietary information included in sensor data includes receiving a confirmation report from each of more than one entity that owns portions of the encrypted data.

Example 14. The method of example 13, wherein the received misbehavior report includes encrypted sensor data or encrypted proprietary information included in sensor data and unencrypted sensor data.

Example 15. A method of protecting proprietary information included in V2X system messages, including: encrypting proprietary information included in sensor data obtained from one or more sensors indicating that a misbehavior condition has occurred; generating a misbehavior report identifying the misbehavior condition and including information regarding the encrypted proprietary information; and transmitting the generated misbehavior report to a misbehavior managing authority.

Example 16. The method of example 15, further including; determining whether the sensor data obtained from one or more sensors indicating that a misbehavior condition has occurred includes proprietary information, in which encrypting proprietary information included in the sensor data includes encrypting portions of the sensor data that include proprietary information in response to determining that the sensor data obtained from one or more sensors indicating that a misbehavior condition has occurred includes proprietary information.

Example 17. The method of either of example 15 or 16, further including: identifying each entity that owns an instance of proprietary information included in the sensor data indicating that a misbehavior condition has occurred, in which encrypting proprietary information included in sensor data obtained from one or more sensors indicating that a misbehavior condition has occurred includes encrypting instances of proprietary information included in the sensor data using a public key associated with the entity that owns respective instances of proprietary information.

Example 18. The method of any of examples 15-17, further including: determining whether it is inappropriate to transmit a misbehavior report including encrypted proprietary information to the misbehavior managing authority; generating the misbehavior report to include the encrypted proprietary information in response to determining that it is appropriate to transmit a misbehavior report including encrypted proprietary information to the misbehavior managing authority; and in response to determining that it is inappropriate to transmit a misbehavior report including encrypted proprietary information to the misbehavior managing authority: generating the misbehavior report to include a field indicating that sensor data indicating that a misbehavior condition has occurred is or will be transmitted separately; and downloading the encrypted proprietary information over a secure communication link.

Example 19. The method of example 18, in which determining whether it is inappropriate to transmit to a misbehavior report to the misbehavior managing authority includes determining that the generated misbehavior report is inappropriate to transmit in response to determining that the encrypted proprietary information that supports the conclusion that the misbehavior condition has occurred is too large to transmit in a misbehavior report.

Example 20. The method of example 18, in which determining whether the generated misbehavior report is inappropriate to transmit to the misbehavior managing authority includes determining that the generated misbehavior report is inappropriate to transmit in response to determining that the encrypted proprietary information that supports the conclusion that the misbehavior condition has occurred should not be transmitted over an unsecure wireless communication link.

Example 21. The method of example 18, in which the field that indicates that sensor data supporting the conclusion that the misbehavior condition has occurred is transmitted separately includes information identifying a location to which the encrypted proprietary information was downloaded over the secure communication link.

Example 22. A sensor configured for installation in a vehicle and to: determine whether a misbehavior condition has occurred based on inputs to the sensor from a V2X system within the vehicle; encrypt proprietary information included in sensor data indicating that a misbehavior condition has occurred; and provide encrypted proprietary information and non-proprietary sensor data that supports the conclusion that the misbehavior condition has occurred to the V2X system within the vehicle, in which the V2X system is configured to support generation of a generating a misbehavior report configured to provide the encrypted proprietary information to a misbehavior managing authority.

Example 23. A method of protecting proprietary information in V2X system messages, including: receiving a misbehavior report from a V2X system participant; obtaining sensor data from the received misbehavior report indicating that a misbehavior condition has occurred; determining whether the sensor data indicating that a misbehavior condition has occurred includes encrypted proprietary information; and in response to determining that the sensor data includes encrypted proprietary information: identifying an entity that owns the encrypted proprietary information; transmitting the misbehavior report including the encrypted proprietary information to the entity that owns the encrypted proprietary information; and receiving a confirmation report from the entity that owns the encrypted proprietary information indicating whether the misbehavior report is accurate.

Example 24. The method of example 23, in which: identifying an entity that owns the encrypted proprietary information includes identifying each entity that owns each instance of encrypted proprietary information included in the misbehavior report; transmitting the misbehavior report including the encrypted proprietary information to the entity that owns the encrypted proprietary information includes transmitting the misbehavior report including the encrypted proprietary information to each entity that owns an instance of encrypted proprietary included in the misbehavior report; and receiving a confirmation report from the entity that owns the encrypted proprietary information indicating whether the misbehavior report is accurate includes receiving a confirmation report from each entity that owns an instance of encrypted proprietary information indicating whether the misbehavior report is supported by that entity's encrypted proprietary information.

Example 25. The method of either of examples 23 or 24, further including: obtaining from the received confirmation report information or instructions for responding to a misbehavior condition identified in the misbehavior report; and transmitting the information or instructions for responding to a misbehavior condition to the V2X system participant.

Example 26. A method of supporting a response to a V2X system message that includes encrypted proprietary information, including: receiving a misbehavior report from a misbehavior managing authority; obtaining identification of a misbehavior condition from the received misbehavior report and information regarding encrypted sensor data or encrypted proprietary information included in sensor data indicating that the misbehavior condition has occurred; decrypting the encrypted sensor data or encrypted proprietary information included in sensor data; determining whether the misbehavior condition is supported at least in part by decrypted proprietary information; generating a confirmation report that indicates whether the misbehavior report is accurate; and transmitting the confirmation report to the misbehavior managing authority.

Example 27. The method of example 26, in which: the information regarding encrypted sensor data or encrypted proprietary information included in sensor data indicating that the misbehavior condition has occurred includes the encrypted sensor data or encrypted proprietary information included in sensor data; and determining whether the misbehavior condition is supported at least in part by decrypted proprietary information includes determining whether the misbehavior condition is supported based at least in part on decrypted sensor data or decrypted proprietary information included in the received misbehavior report.

Example 28. The method of either of examples 26 or 27, in which obtaining identification of a misbehavior condition from the received misbehavior report and information regarding encrypted sensor data or encrypted proprietary information included in sensor data indicating that the misbehavior condition has occurred includes: reading a field in the misbehavior report indicating that sensor data indicating that a misbehavior condition has occurred is or will be transmitted separately; and receiving the encrypted sensor data or encrypted proprietary information included in sensor data over a secure communication link.

Example 29. The method of any of examples 26-28, further including: determining information or instructions for a V2X system participant to respond to the misbehavior condition in response to determining that the conclusion that a misbehavior condition has occurred is accurate; and including the information or instructions in the confirmation report.

Further example implementations may include example methods discussed in the following paragraphs implemented by a proprietary information owner server, including a processor configured with processor-executable instructions to perform operations of the methods of the following implementation examples; the example methods discussed in the following paragraphs implemented by a proprietary information owner server including means for performing functions of the methods of the following implementation examples; and the example methods discussed in the following paragraphs may be implemented as a non-transitory processor-readable storage medium having stored thereon processor-executable instructions configured to cause a proprietary information owner server processor to perform the operations of the methods of the following implementation examples.

Example 15. A method of protecting proprietary information supporting a determination of a misbehavior conditions in a V2X system, including: receiving a misbehavior report from a misbehavior managing authority; parsing the misbehavior report to obtain a conclusion that a misbehavior condition has occurred and encrypted sensor data or encrypted proprietary information included in sensor data that supports the conclusion that the misbehavior condition has occurred; decrypting the encrypted sensor data or encrypted proprietary information included in sensor data; determining whether the conclusion that a misbehavior condition has occurred is accurate based at least in part on decrypted sensor data or decrypted proprietary information; generating a confirmation report that indicates whether the misbehavior report is accurate; and transmitting the confirmation report to the misbehavior managing authority.

Example 16. The method of example 15, further including determining remedial measures for a V2X system participant to initiate to correct a sensor in response to determining that the conclusion that a misbehavior condition has occurred is accurate, wherein the confirmation report includes the remedial measures.

Example 17. The method of example 16, wherein: the received misbehavior report includes encrypted sensor data or encrypted proprietary information included in sensor data and unencrypted sensor data or encrypted proprietary information included in sensor data, and determining whether the conclusion that the misbehavior condition has occurred is accurate based on decrypted sensor data or decrypted proprietary information includes determining whether the conclusion that the misbehavior condition has occurred is accurate based on decrypted sensor data or decrypted proprietary information and the unencrypted sensor data.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of protecting proprietary information in vehicle-to-everything (V2X) system messages, comprising:

receiving a misbehavior report from a V2X system participant;

obtaining sensor data from the received misbehavior report indicating that a misbehavior condition has occurred;

determining whether the sensor data indicating that a misbehavior condition has occurred includes encrypted proprietary information; and in response to determining that the sensor data includes encrypted proprietary information:

identifying an entity that owns the encrypted proprietary information;

transmitting the misbehavior report including the encrypted proprietary information to the entity that owns the encrypted proprietary information; and receiving a confirmation report from the entity that owns the encrypted proprietary information indicating whether the misbehavior report is accurate.

2. The method of claim 1, wherein:

identifying the entity that owns the encrypted proprietary information comprises identifying each entity that owns each instance of encrypted proprietary information included in the misbehavior report;

transmitting the misbehavior report including the encrypted proprietary information to the entity that owns the encrypted proprietary information comprises transmitting the misbehavior report including the encrypted proprietary information to each entity that owns an instance of encrypted proprietary included in the misbehavior report; and receiving a confirmation report from the entity that owns the encrypted proprietary information indicating whether the sensor data is accurate comprises receiving a confirmation report from each entity that owns an instance of encrypted proprietary information indicating whether the misbehavior report is supported by that entity's encrypted proprietary information.

3. The method of claim 1, further comprising:

obtaining, from the received confirmation report, information or instructions for responding to a misbehavior condition identified in the misbehavior report; and transmitting the information or instructions for responding to a misbehavior condition to the V2X system participant.

4. The method of claim 1, wherein determining whether the sensor data indicating that a misbehavior condition has occurred includes encrypted proprietary information comprises identifying that the sensor data includes proprietary information based on a configuration setting.

5. The method of claim 1, wherein receiving a confirmation report from the entity that owns the encrypted proprietary information comprises receiving, over a separate secure communication link, information regarding the sensor data sufficient to confirm whether the misbehavior condition occurred.

6. The method of claim 5, further comprising:

evaluating the misbehavior report based on the confirmation report to determine whether the misbehavior report is confirmed.

7. The method of claim 1, wherein transmitting the misbehavior report including the encrypted proprietary information to the entity that owns the encrypted proprietary information comprises:

storing the encrypted proprietary information at a location in a memory associated with or controlled by the owner of the sensor data; and transmitting the owner of the sensor data the location in the memory containing the encrypted proprietary information.

8. A computing device, comprising:

a processor configured with processor-executable instructions to:

receive a misbehavior report identifying a misbehavior condition has occurred from a V2X system participant;

obtain sensor data from the received misbehavior report indicating that the misbehavior condition has occurred;

determine whether the sensor data indicating that the misbehavior condition has occurred includes encrypted proprietary information; and in response to determining that the sensor data includes encrypted proprietary information:

identify an entity that owns the encrypted proprietary information;

transmit the misbehavior report including the encrypted proprietary information to the entity that owns the encrypted proprietary information; and receive a confirmation report from the entity that owns the encrypted proprietary information indicating whether the misbehavior report is accurate.

9. The computing device of claim 8, wherein the processor is further configured with processor-executable instructions to:

identify each entity that owns each instance of encrypted proprietary information included in the misbehavior report;

transmit the misbehavior report including the encrypted proprietary information to each entity that owns an instance of encrypted proprietary information included in the misbehavior report; and receive a confirmation report from each entity that owns an instance of encrypted proprietary information indicating whether the misbehavior report is supported by that entity's encrypted proprietary information.

10. The computing device of claim 8, wherein the processor is further configured with processor-executable instructions to:

obtain, from the received confirmation report, information or instructions for responding to a misbehavior condition identified in the misbehavior report; and transmit the information or instructions for responding to a misbehavior condition to the V2X system participant.

11. The computing device of claim 8, wherein the processor is further configured with processor-executable instructions to determine whether the sensor data indicating that a misbehavior condition has occurred by identifying that the sensor data includes proprietary information based on a configuration setting.

12. The computing device of claim 8, wherein the processor is further configured with processor-executable instructions to receive the confirmation report from the entity that owns the encrypted proprietary information over a separate secure communication link information regarding the sensor data that is sufficient to confirm whether the misbehavior condition occurred.

13. The computing device of claim 8, wherein the processor is further configured with processor-executable instructions to evaluate the misbehavior report based on the confirmation report to determine whether the misbehavior report is confirmed.

14. The computing device of claim 10, wherein the processor is further configured with processor-executable instructions to transmit the misbehavior report including the encrypted proprietary information to the entity that owns the encrypted proprietary information by:

storing the encrypted proprietary information at a location in a memory associated with or controlled by the owner of the sensor data; and transmitting the owner of the sensor data the location in the memory containing the encrypted proprietary information.

15. A non-transitory processor-readable medium having stored thereon processor-executable instructions configured to cause a processor a of a computing device to perform operations comprising:

receiving a misbehavior report from a V2X system participant;

obtaining sensor data from the received misbehavior report indicating that a misbehavior condition has occurred;

determining whether the sensor data indicating that a misbehavior condition has occurred includes encrypted proprietary information; and identifying an entity that owns the encrypted proprietary information in response to determining that the sensor data includes encrypted proprietary information;

transmitting the misbehavior report including the encrypted proprietary information to the entity that owns the encrypted proprietary information; and receiving a confirmation report from the entity that owns the encrypted proprietary information indicating whether the misbehavior report is accurate.

16. The non-transitory processor-readable medium of claim 15, wherein the stored processor-executable instructions are configured to cause the processor of the computing device to perform operations further comprising:

identifying the entity that owns the encrypted proprietary information comprises means for identifying each entity that owns each instance of encrypted proprietary information included in the misbehavior report;

transmitting the misbehavior report including the encrypted proprietary information to the entity that owns the encrypted proprietary information comprises means for transmitting the misbehavior report including the encrypted proprietary information to each entity that owns an instance of encrypted proprietary included in the misbehavior report; and receiving a confirmation report from the entity that owns the encrypted proprietary information indicating whether the sensor data is accurate comprises means for receiving a confirmation report from each entity that owns an instance of encrypted proprietary information indicating whether the misbehavior report is supported by that entity's encrypted proprietary information.

17. The non-transitory processor-readable medium of claim 15, wherein the stored processor-executable instructions are configured to cause the processor of the computing device to perform operations further comprising:

obtaining, from the received confirmation report, information or instructions for responding to a misbehavior condition identified in the misbehavior report; and transmitting the information or instructions for responding to a misbehavior condition to the V2X system participant.

18. The non-transitory processor-readable medium of claim 15, wherein the stored processor-executable instructions are configured to cause the processor of the computing device to perform operations such that determining whether the sensor data indicating that a misbehavior condition has occurred includes encrypted proprietary information comprises identifying that the sensor data includes proprietary information based on a configuration setting.

19. The non-transitory processor-readable medium of claim 15, wherein the stored processor-executable instructions are configured to cause the processor of the computing device to perform operations such that receiving a confirmation report from the entity that owns the encrypted proprietary information comprises receiving, over a separate secure communication link, information regarding the sensor data sufficient to confirm whether the misbehavior condition occurred.

20. The non-transitory processor-readable medium of claim 15, wherein the stored processor-executable instructions are configured to cause the processor of the computing device to perform operations such that transmitting the misbehavior report including the encrypted proprietary information to the entity that owns the encrypted proprietary information comprises:

storing the encrypted proprietary information at a location in a memory associated with or controlled by the owner of the sensor data; and transmitting the owner of the sensor data the location in the memory containing the encrypted proprietary information.

* * * * *